United States Patent
Kurihara et al.

(10) Patent No.: US 9,553,928 B2
(45) Date of Patent: Jan. 24, 2017

(54) DATA SHARING METHOD AND DATA PROCESSING SYSTEM

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Hiromasa Yamauchi, Usakos (NA); Naoki Odate, Akiruno (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 339 days.

(21) Appl. No.: 14/090,954

(22) Filed: Nov. 26, 2013

(65) Prior Publication Data

US 2014/0089377 A1 Mar. 27, 2014

Related U.S. Application Data

(63) Continuation of application No. PCT/JP2011/062544, filed on May 31, 2011.

(51) Int. Cl.
*G06F 15/167* (2006.01)
*H04L 29/08* (2006.01)
(Continued)

(52) U.S. Cl.
CPC ....... *H04L 67/1095* (2013.01); *G06F 11/3058* (2013.01); *G06F 17/30206* (2013.01);
(Continued)

(58) Field of Classification Search
CPC ............ G06F 11/3058; G06F 17/30206; H04L 67/1095; H04W 52/0254; H04W 52/0261
(Continued)

(56) References Cited

U.S. PATENT DOCUMENTS

2007/0043805 A1* 2/2007 Izaki ..................... G06F 3/1204 709/201
2007/0150896 A1* 6/2007 Gebhart ................ G06F 9/5044 718/104
(Continued)

FOREIGN PATENT DOCUMENTS

JP 10-187524 7/1998
JP 11-15732 1/1999
(Continued)

OTHER PUBLICATIONS

International Search Report mailed Sep. 13, 2011 in corresponding International Application No. PCT/JP2011/062544.
(Continued)

*Primary Examiner* — Wing F Chan
*Assistant Examiner* — Joseph Maniwang
(74) *Attorney, Agent, or Firm* — Staas & Halsey LLP

(57) ABSTRACT

A data sharing method includes detecting by a first data processing apparatus that is among multiple data processing apparatuses that share data, any one among a shortage of available memory, a change in remaining battery power, a change in a relative positional distance of the first data processing apparatus to a second data processing apparatus that is among the data processing apparatuses, a change in a communication speed of communication with the second data processing apparatus, and an interruption of communication with the second data processing apparatus; and transmitting by the first data processing apparatus to a third data processing apparatus that is among the data processing apparatuses, a shared portion of the data saved in the first data processing apparatus.

11 Claims, 20 Drawing Sheets

(51) Int. Cl.
  *H04W 52/02* (2009.01)
  *G06F 11/30* (2006.01)
  *G06F 17/30* (2006.01)
  *G06F 11/34* (2006.01)

(52) U.S. Cl.
  CPC ... *H04W 52/0254* (2013.01); *H04W 52/0261* (2013.01); *G06F 11/3062* (2013.01); *G06F 11/349* (2013.01)

(58) Field of Classification Search
  USPC .......................................... 709/202, 213–216
  See application file for complete search history.

(56) References Cited

U.S. PATENT DOCUMENTS

2010/0022231 A1* 1/2010 Heins .................. H04M 3/4872
  455/418
2012/0254280 A1* 10/2012 Parker, II .............. G06F 9/5044
  709/201

FOREIGN PATENT DOCUMENTS

| JP | 2002-112314 | 4/2002 |
| JP | 2008-306682 | 12/2008 |

OTHER PUBLICATIONS

International Preliminary Report on Patentability mailed Dec. 12, 2013 in corresponding International Patent Application No. PCT/JP2011/062544.

\* cited by examiner

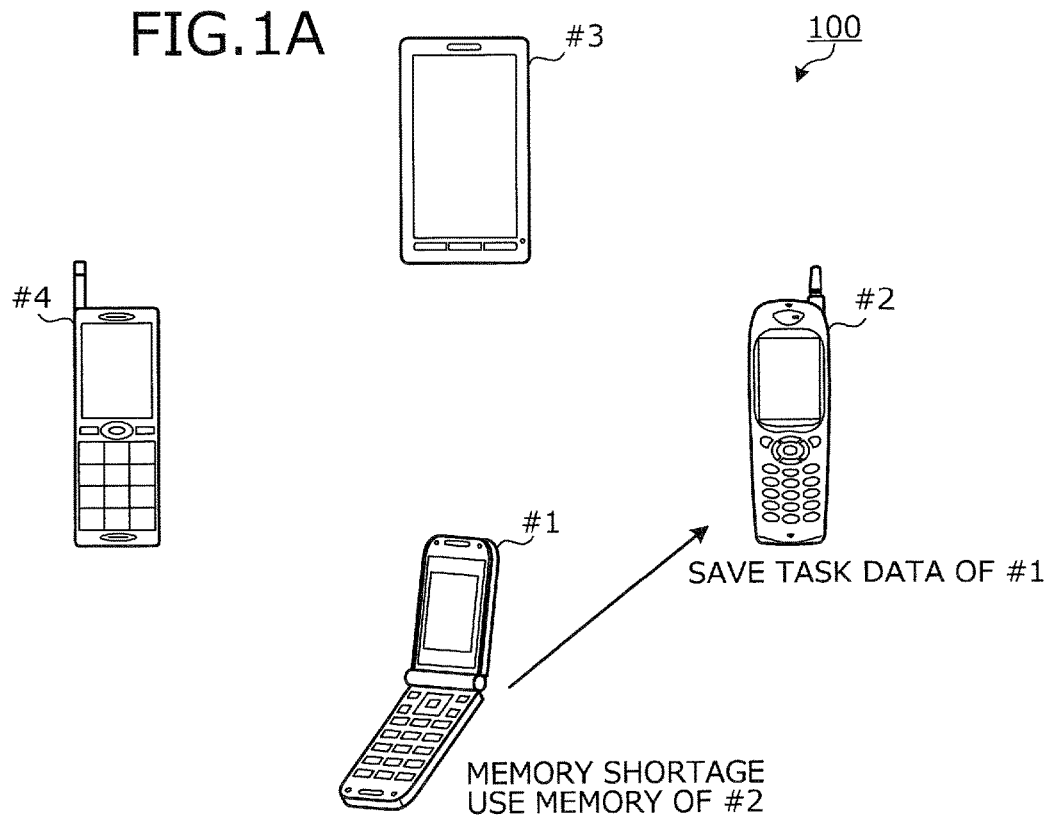

| TERMINAL | COMMUNICATION SPEED | RELATIVE POSITIONAL DISTANCE CHANGE TENDENCY | COMMUNICATION SPEED CHANGE TENDENCY |
|---|---|---|---|
| #1-#2 | B | CONSTANT | CONSTANT |
| #1-#3 | E | DECREASE | DECREASE |
| #1-#4 | A | INCREASE | INCREASE |
| #2-#3 | C | CONSTANT | DECREASE |
| #2-#4 | F | CONSTANT | INCREASE |
| #3-#4 | D | DECREASE | DECREASE |

| TERMINAL | COMMUNICATION SPEED | RELATIVE POSITIONAL DISTANCE CHANGE TENDENCY | COMMUNICATION SPEED CHANGE TENDENCY |
|---|---|---|---|
| #1-#2 | B' | INCREASE | DECREASE |
| #1-#3 | E | DECREASE | DECREASE |
| #1-#4 | A | INCREASE | INCREASE |
| #2-#3 | C | CONSTANT | DECREASE |
| #2-#4 | F | CONSTANT | INCREASE |
| #3-#4 | D | DECREASE | DECREASE |

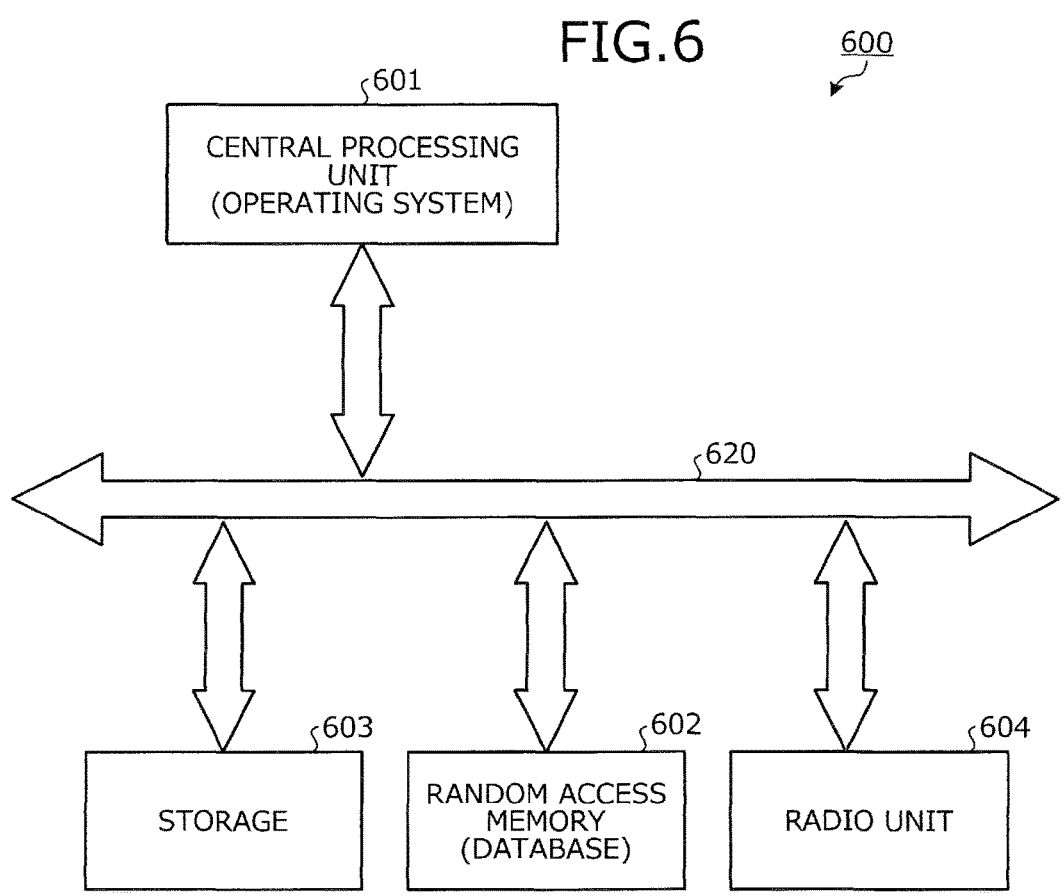

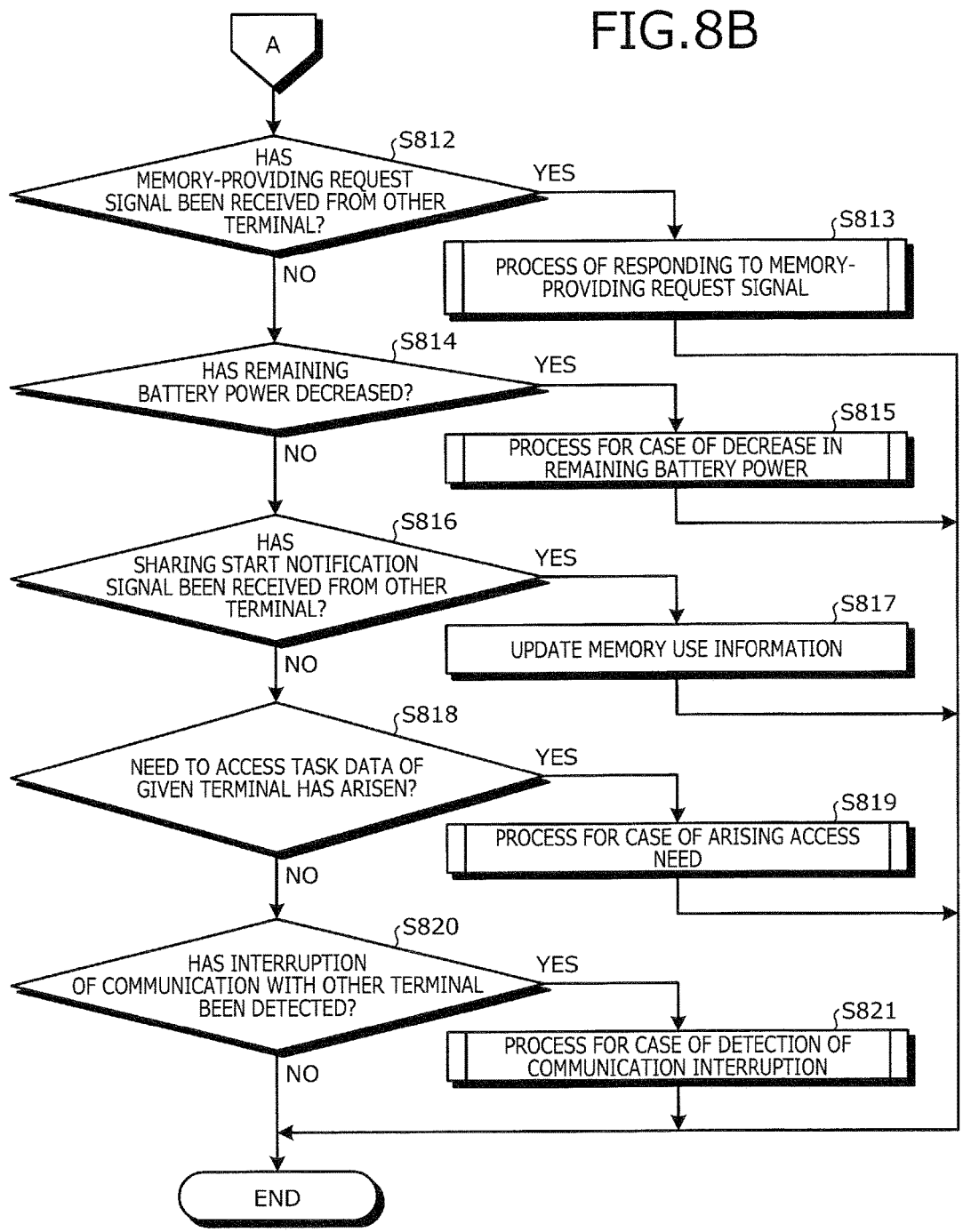

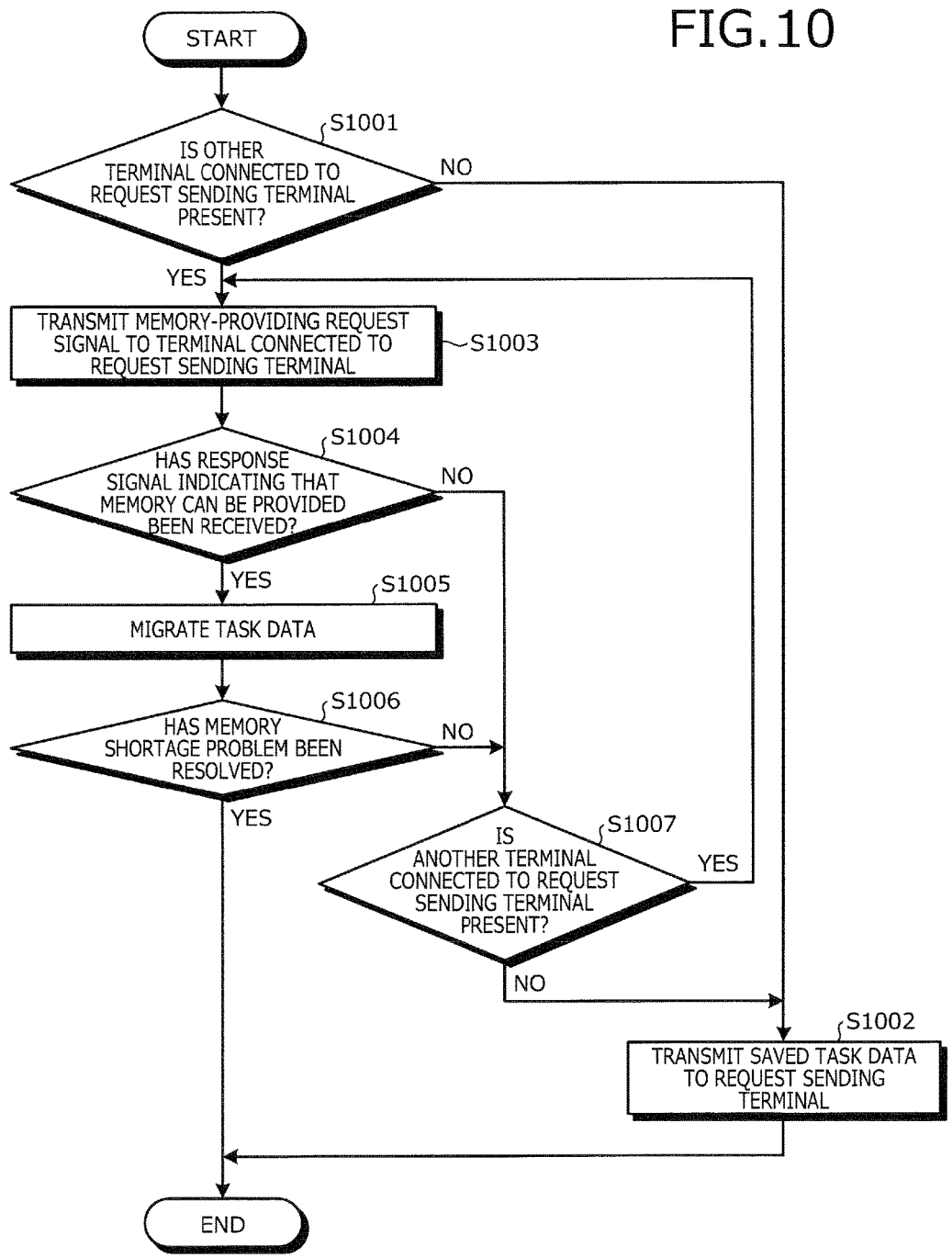

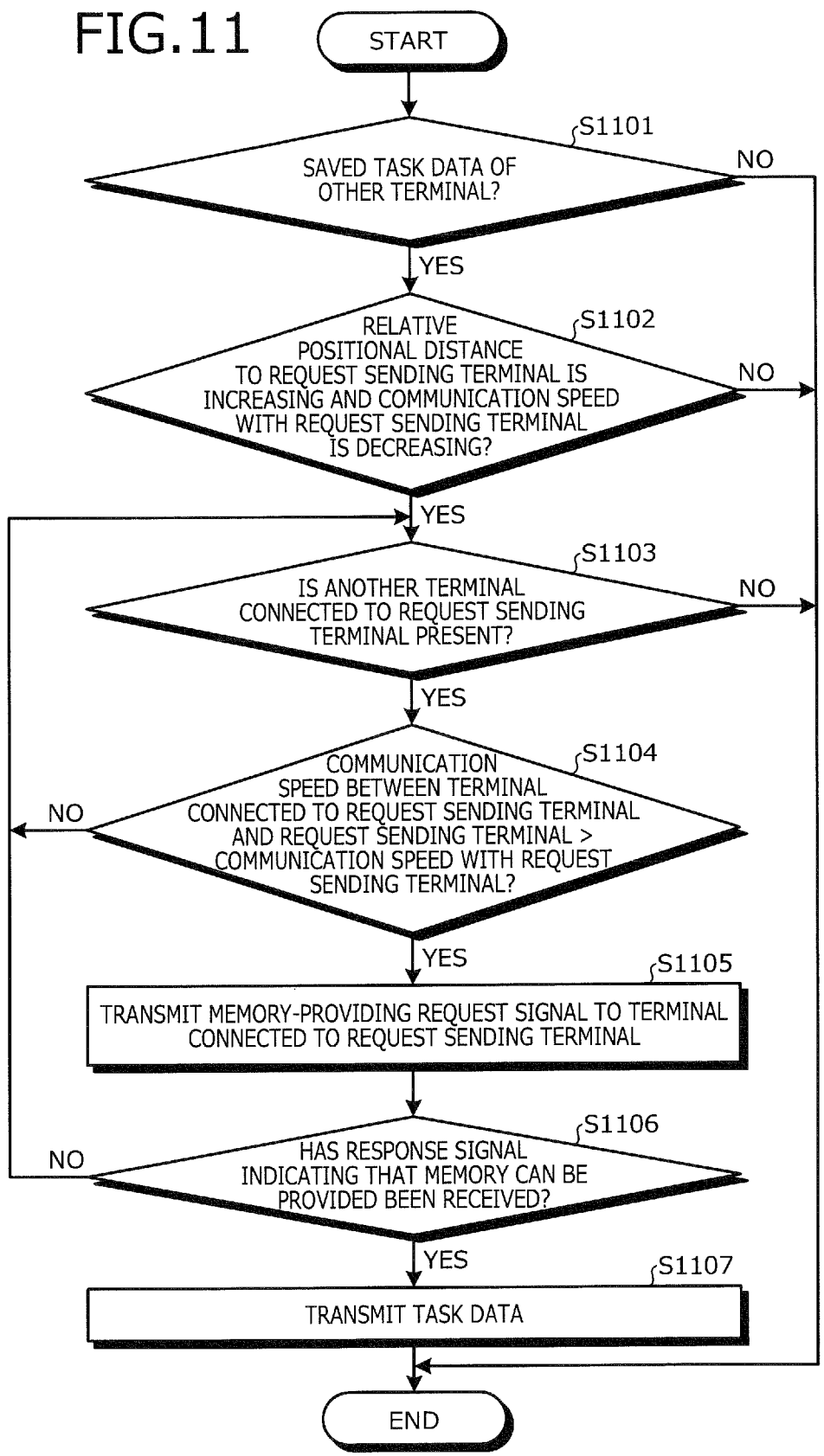

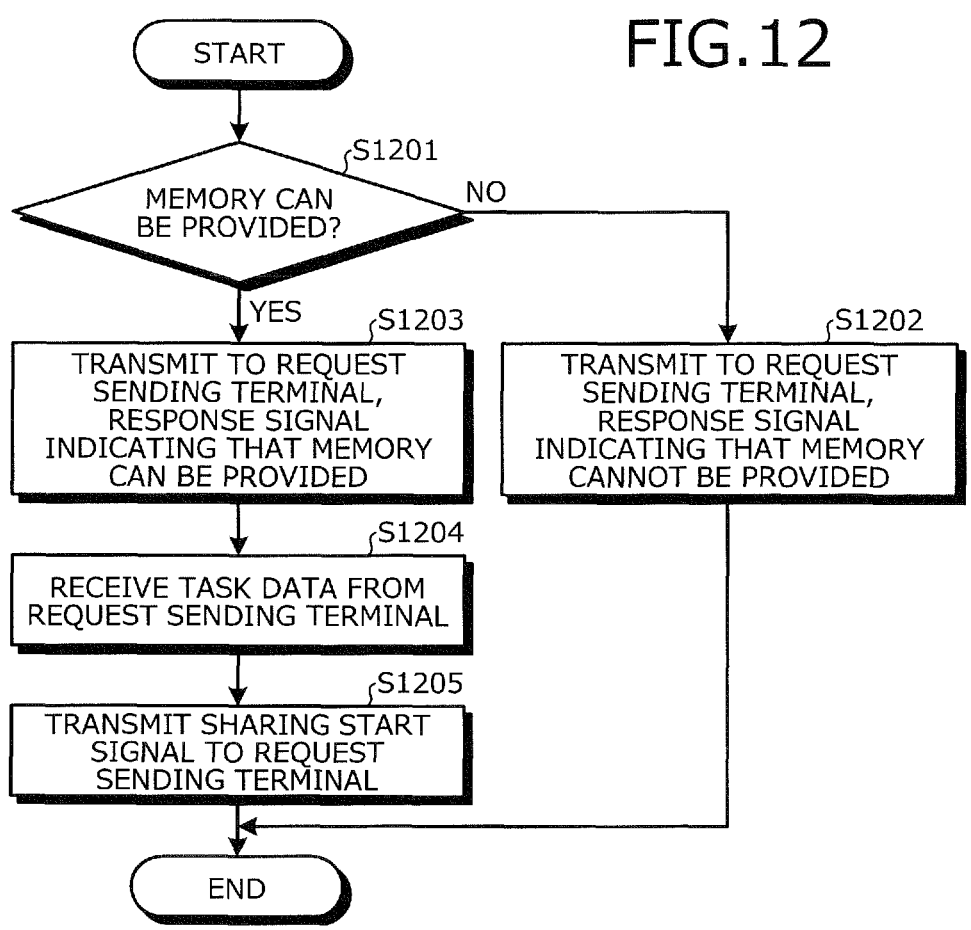

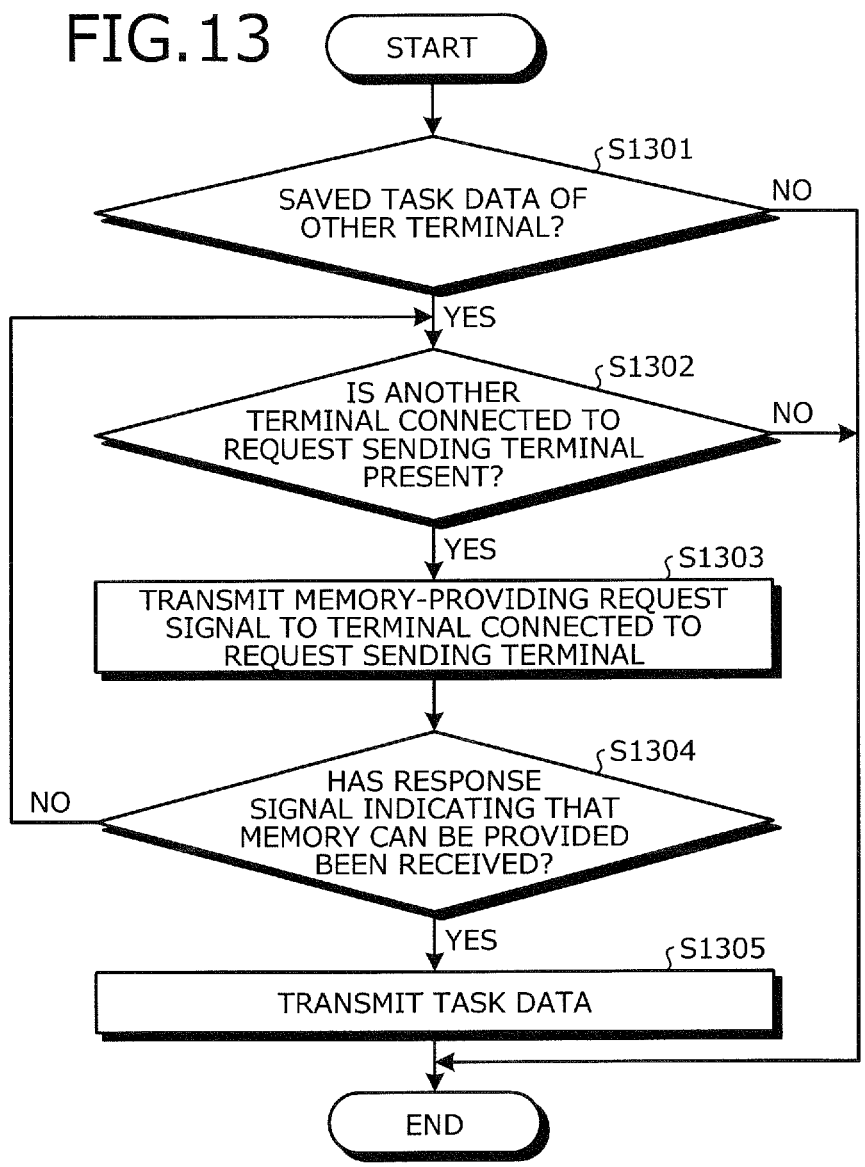

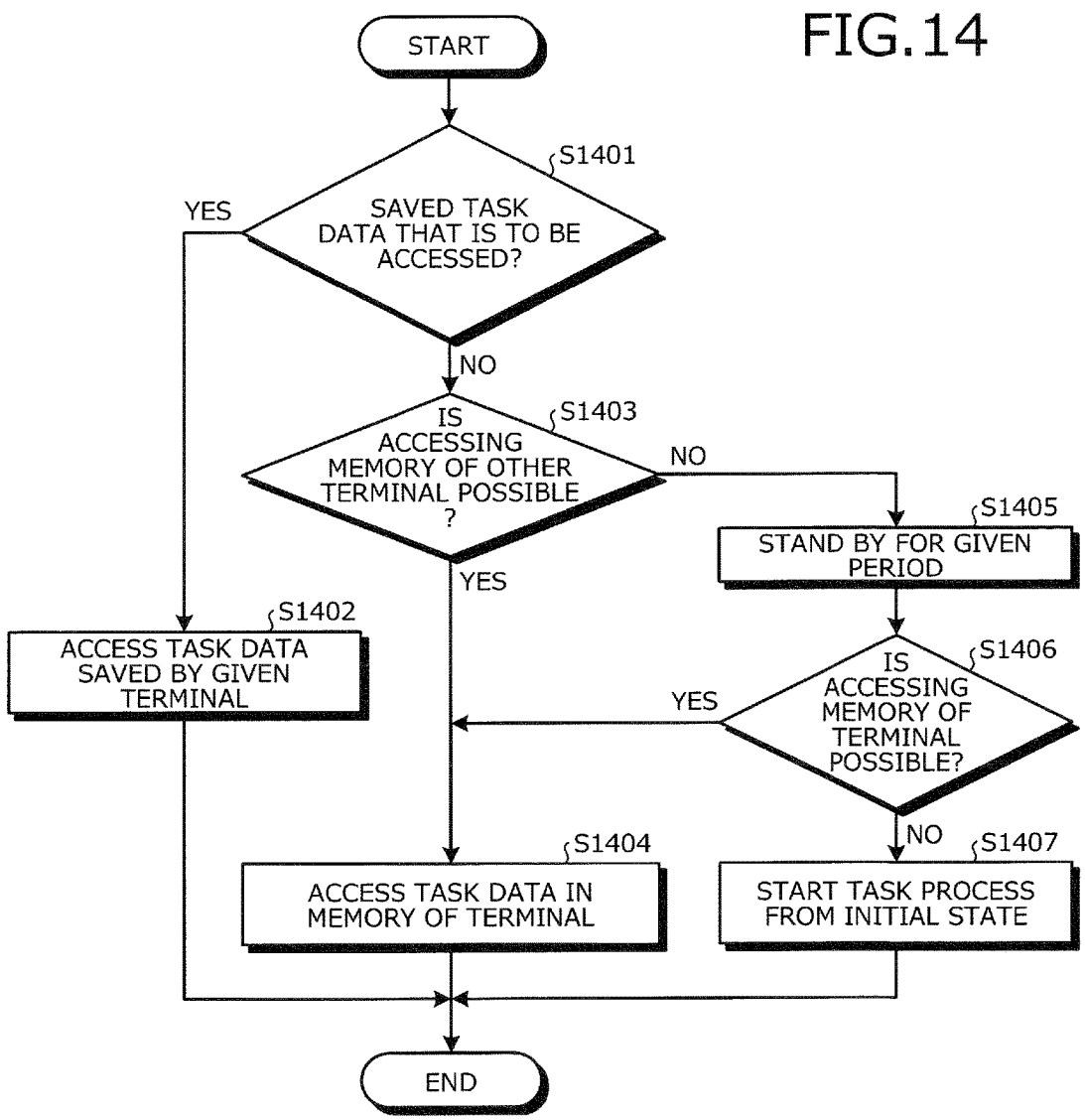

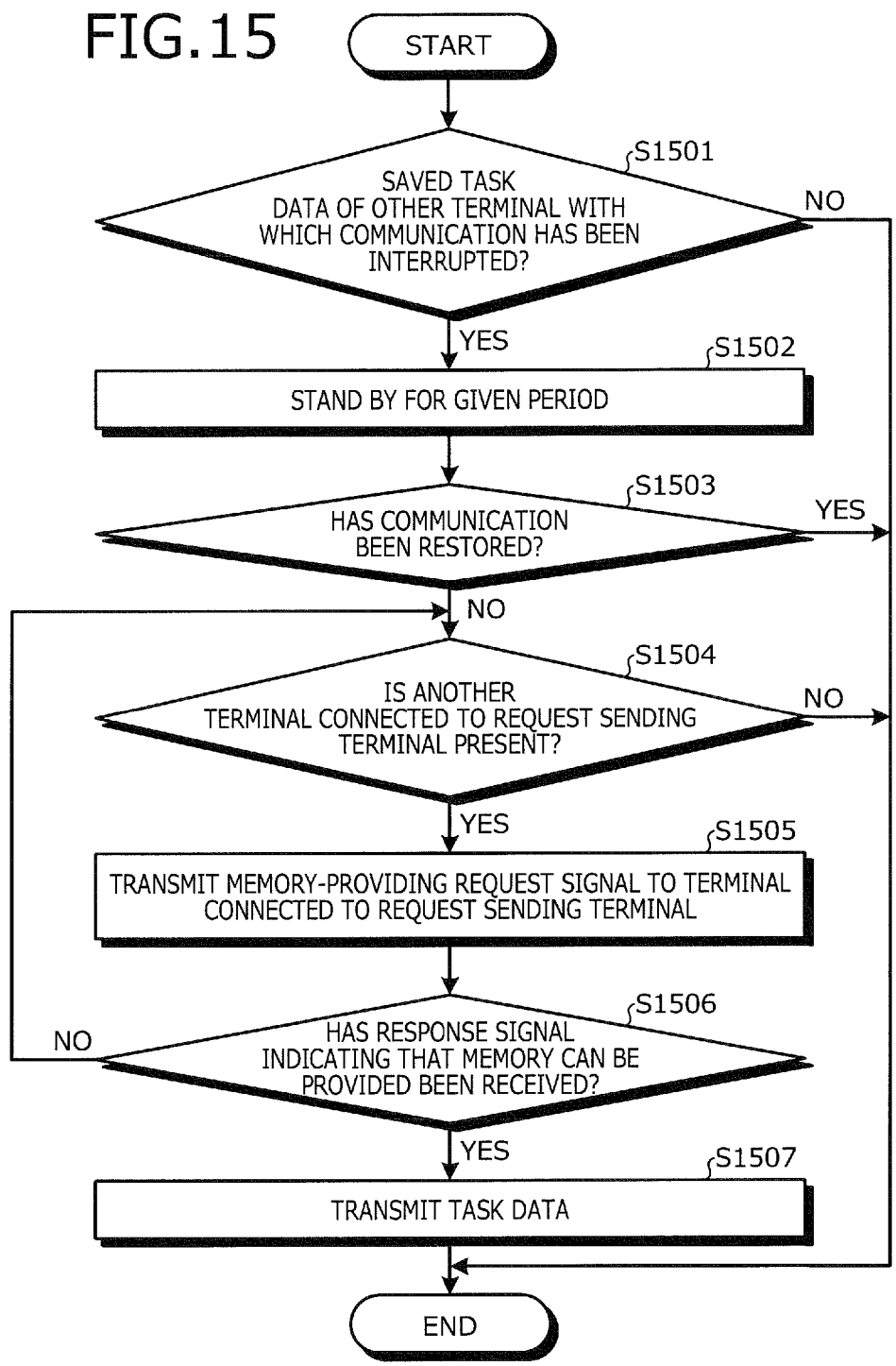

DATA SHARING METHOD AND DATA PROCESSING SYSTEM

CROSS REFERENCE TO RELATED APPLICATIONS

This application is a continuation application of International Application PCT/JP2011/062544, filed on May 31, 2011 and designating the U.S., the entire contents of which are incorporated herein by reference.

FIELD

The embodiment discussed herein is related to a data sharing method and a data processing system.

BACKGROUND

In the field of large-scale parallel computing machines, a system in which memory resources are shared between computers connected to a network, such as a local area network (LAN), has been proposed (see, e.g., Japanese Laid-Open Patent Publication No. H11-15732). When multiple computers interconnected through a wired network share memory resources, the number of terminals and communication speed between terminals hardly change.

Terminals, such as cellular phones, interconnected through a radio network have memory resources of a limited capacity, which may bring about a situation where the memory capacity becomes insufficient when a business-oriented application is used.

When memory is shared between terminals interconnected through a radio network, communication tends to be unstable. This may lead to a case where when a terminal tries to access data temporarily saved in another terminal, the terminal cannot communicate with the other terminal saving the data and fails to collect the data. If such a case happens, processing of the data temporarily saved in the other terminal is suspended, arising in a problem of unstable processing.

SUMMARY

According to an aspect of an embodiment, a data sharing method includes detecting by a first data processing apparatus that is among multiple data processing apparatuses that share data, any one among a shortage of available memory, a change in remaining battery power, a change in a relative positional distance of the first data processing apparatus to a second data processing apparatus that is among the data processing apparatuses, a change in a communication speed of communication with the second data processing apparatus, and an interruption of communication with the second data processing apparatus; and transmitting by the first data processing apparatus to a third data processing apparatus that is among the data processing apparatuses, a shared portion of the data saved in the first data processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of an example of a communication system according to an embodiment;

FIG. 1D is a diagram of an example of a change in the state table;

FIG. 6 is a block diagram of an example of a hardware configuration of a terminal;

FIGS. 8A and 8B are flowcharts of an example of a process by an operating system;

FIG. 10 is a flowchart of an example of a process of migrating task data of another terminal to yet another terminal when memory shortage occurs;

FIG. 11 is a flowchart of an example of a process for a case of a state change between terminals;

FIG. 12 is a flowchart of an example of a response process of responding to a memory-providing request signal;

FIG. 13 is a flowchart of an example of a process for a case of a decrease in remaining battery power;

FIG. 14 is a flowchart of an example of a process for a case of an arising access need; and FIG. 15 is a flowchart of an example of a process for a case of detection of communication interruption.

DESCRIPTION OF EMBODIMENTS

Embodiments of a data sharing method and a data processing system will be described in detail with reference to the accompanying drawings.

FIG. 1A depicts an example of a communication system according to an embodiment. A communication system 100 of FIG. 1A includes terminals #1 to #4. The terminals #1 to #4 are interconnected through radio communication, such as ad hoc communication. The terminals #1 to #4 are data processing apparatuses that perform memory sharing to share task data, etc.

Figures 1B, 1C:
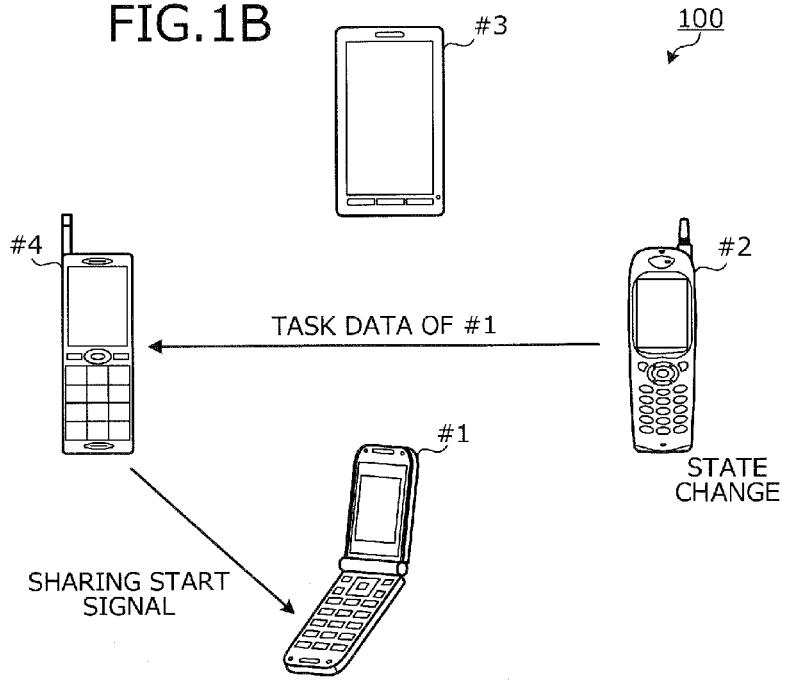
FIG. 1B is a diagram of migration of task data by a memory-providing terminal.
FIG. 1C is a diagram of an example of a state table shared between terminals.

With reference to FIGS. 1A and 1B, memory sharing will be described by taking an example in which at least a portion of task data used for a task of the terminal #1 (second data processing apparatus) is saved in the memory of any one of the terminals #2 to #4. In the example of FIG. 1A, a shortage of memory (memory resource) is detected at the terminal #1. The amount of memory used by a task to be executed is stored in the memory of the terminal #1. For example, the terminal #1 compares the amount of the memory used by the task to be executed and the available amount of memory of the terminal #1, and thereby detects a shortage of memory.

Upon detecting a shortage of memory, the terminal #1 selects from among the terminals #2 to #4 connected to the terminal #1, a terminal with which the terminal #1 the terminal #1 acquires information that indicates the communication qualities of communication between the terminal #1 and the terminals #2 to #4. The communication qualities include, for example, communication speed and communication strength. For example, a received signal strength indicator (RSSI) can be used as the communication strength.

The terminal #1, for example, selects a terminal that has the highest communication quality (highest communication speed or communication strength) in communication with the terminal #1, from among the terminals #2 to #4, as the request receiving terminal. This allows the terminal #1 to perform a task data (data) transmitting/receiving process for memory sharing at high speed. In the example of FIG. 1A, the terminal #1 selects the terminal #2 (first data processing apparatus) as the request receiving terminal. The terminal #1 transmits at least part of task data used for a task of the terminal #1, to the selected terminal #2. The terminal #1 deletes the data transmitted to the terminal #2, from the memory of the terminal #1. The terminal #2 saves the received task data from the terminal #1 to the memory of the terminal #2.

When the task of the terminal #1 requires access to the task data transmitted to the terminal #2, the terminal #1 communicates with the terminal #2 and thereby, accesses the task data saved in the memory of the terminal #2. In this manner, the terminal #2 performs memory sharing by providing the terminal #1 with memory. Through this memory sharing, the amount of use of a memory space can be distributed among the terminals #1 and #2.

FIG. 1B depicts migration of task data by a memory-providing terminal. In FIG. 1B, components identical to those depicted in FIG. 1A are denoted by the same reference numerals used in FIG. 1A and are omitted in further description. A case is assumed where a change in the state of the terminal #2 (memory-providing terminal) saving data of the terminal #1 (see, e.g., FIGS. 2AA to 5BB) has lead to a given situation in which the terminal #1 may be unable to collect its task data from the terminal #2.

The given situation is, for example, a situation in which the terminal #2 detects a shortage of memory thereof. The terminal #2 detects a shortage of the memory thereof, for example, when the memory volume of the terminal #2 is smaller than the volume of the task data transmitted from the terminal #1.

Figure 4A:
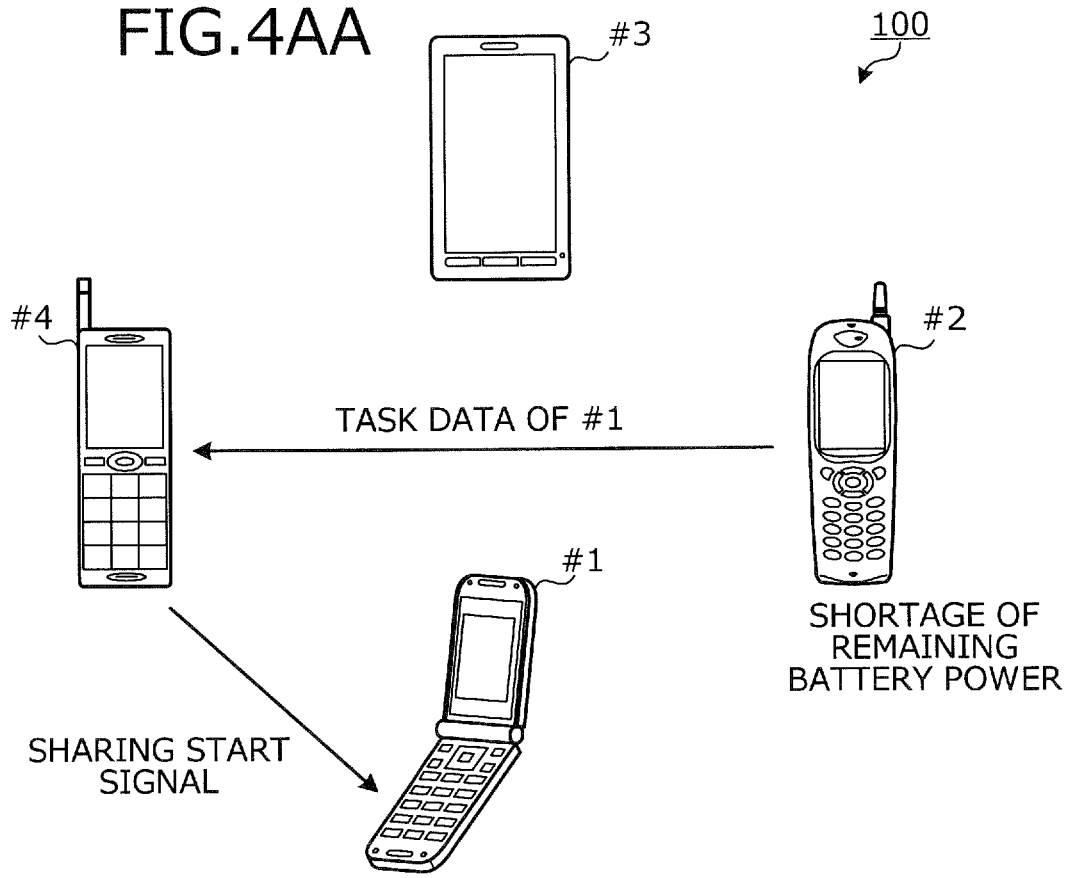
FIGS. 4AA and 4AB are diagrams of task data migration caused by a shortage of remaining battery power.
Figure 4A:
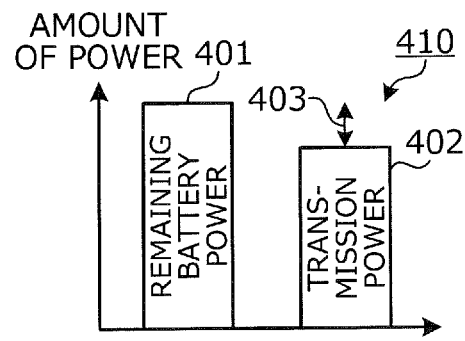
Figure 4B:
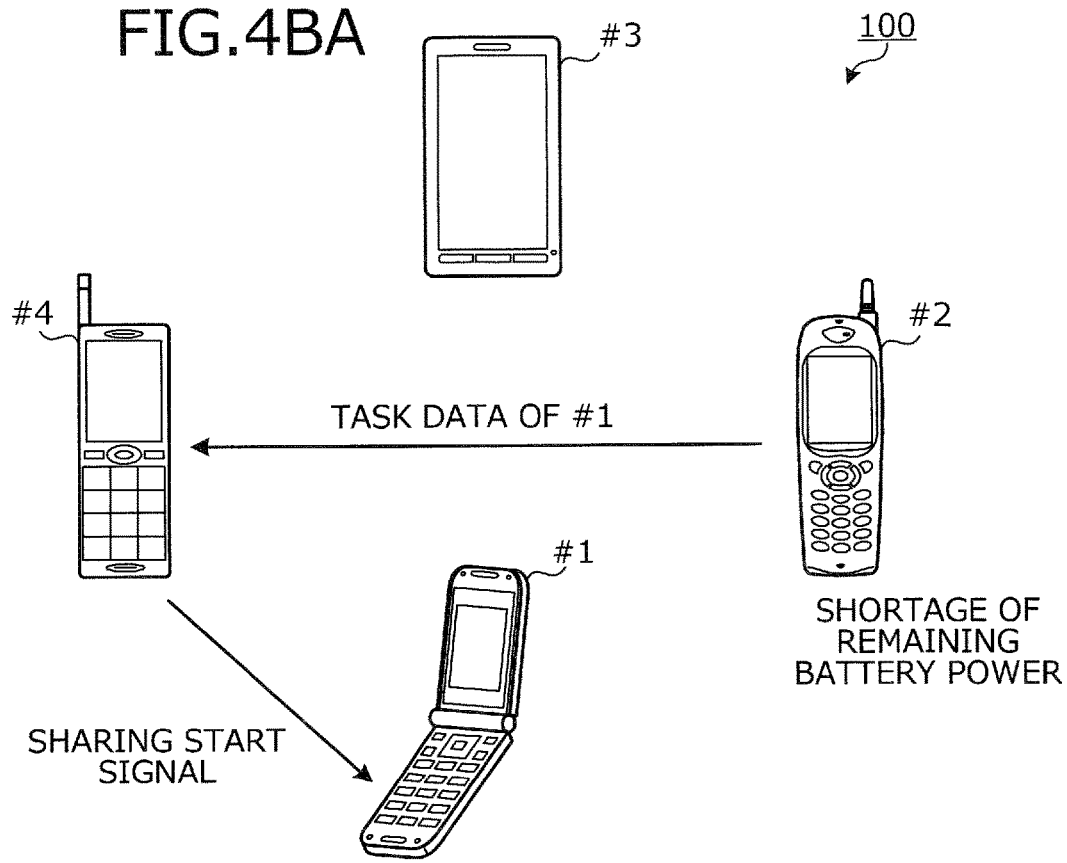
FIGS. 4BA and 4BB are diagrams of task data migration caused by a shortage of remaining battery power.
Figure 4B:
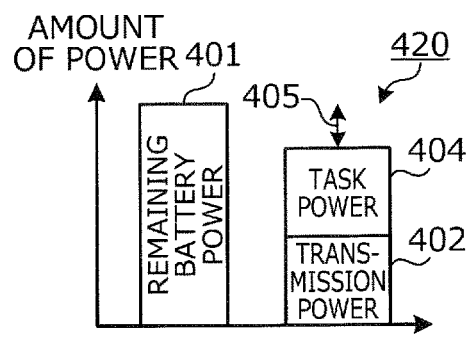

The given situation may be a situation in which the terminal #2 detects a change in the remaining battery power (see, e.g., FIGS. 4A and 4B). A change in the remaining battery power is, for example, a decrease in the remaining battery power, which is, for example, a case where the remaining battery power decreases to become less than or equal to a threshold.

The given situation may be a situation in which the terminal #2 detects a change in the relative positional distance of the terminal #2 to the terminal #1 among the terminals #1 to #4 (see, e.g., FIG. 3). The relative positional distance, for example, represents the distance between one terminal and another terminal and is determined by the terminals' relative positions to each other. A change in the relative positional distance is, for example, an increase in the relative positional distance, which is, for example, a case where in periodical measurement of the relative positional distance, an increase of the relative positional distance registered at the latest measurement to the relative positional distance registered at the previous measurement is greater than or equal to a threshold.

The given situation may be a situation in which the terminal #2 detects a change in the communication speed of communication with the terminal #1 (see, e.g., FIG. 2). A change in the communication speed is, for example, a decrease in the communication speed, which is, for example, a case where in periodical measurement of the communication speed, a decrease in the communication speed registered at the latest measurement to the communication speed registered at the previous measurement is greater than or equal to a threshold.

Figure 5A:
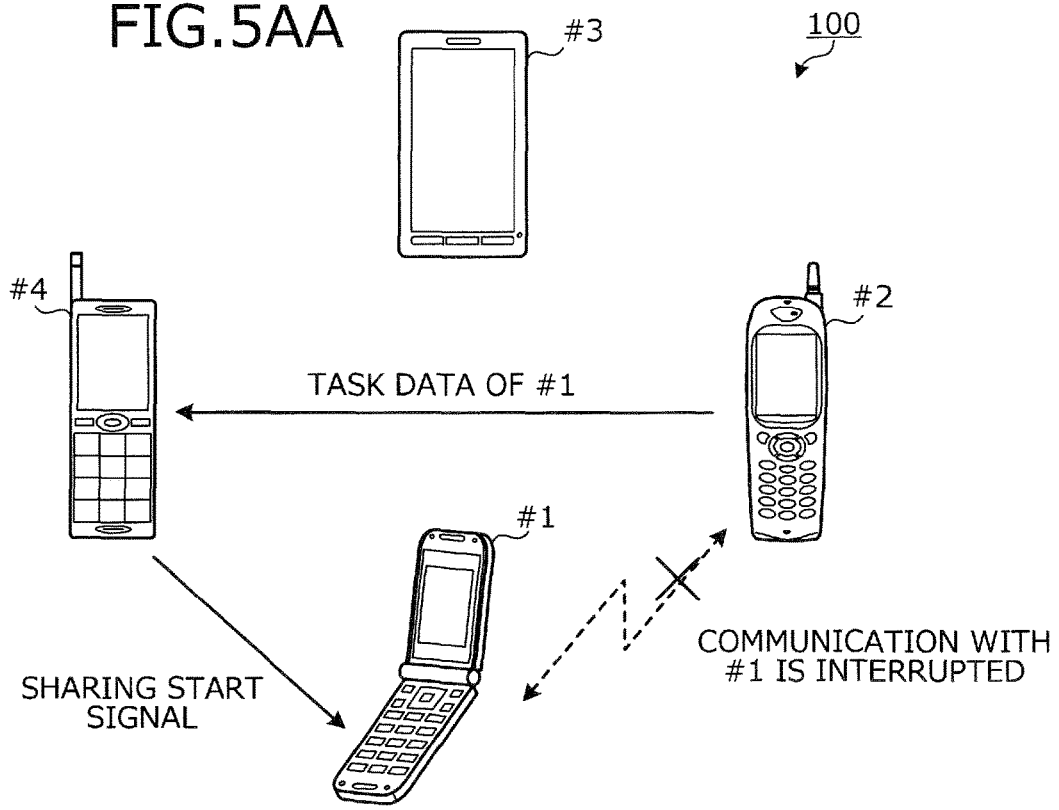
FIGS. 5AA and 5AB are diagrams of task data migration caused by interruption of communication.
Figure 5A:
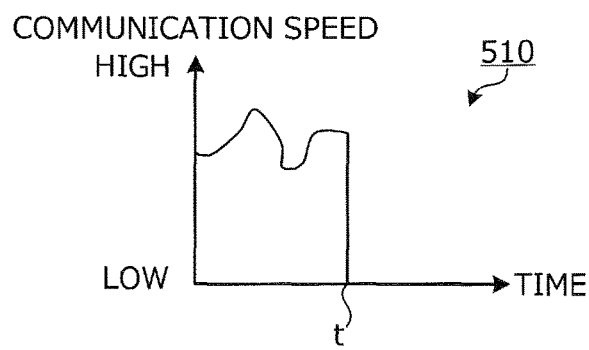
Figure 5B:
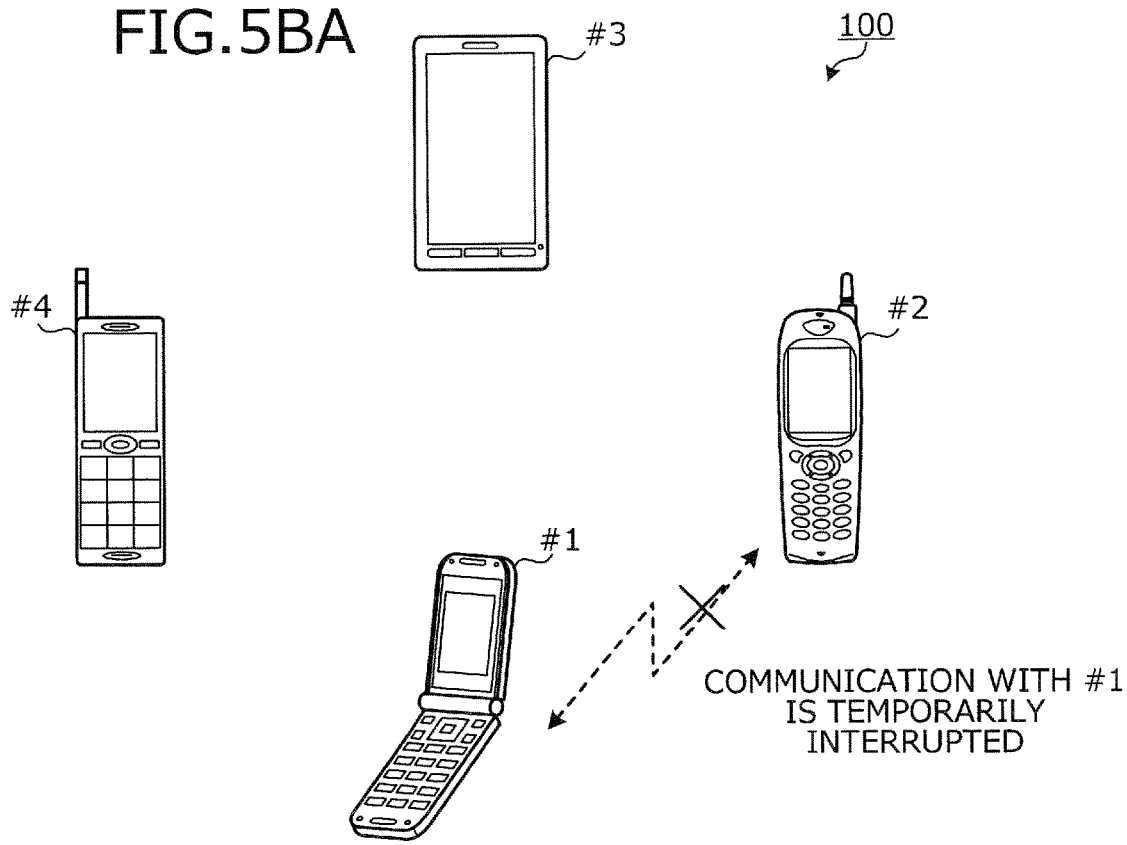
FIGS. 5BA and 5BB are diagrams of task data migration caused by interruption of communication.
Figure 5B:
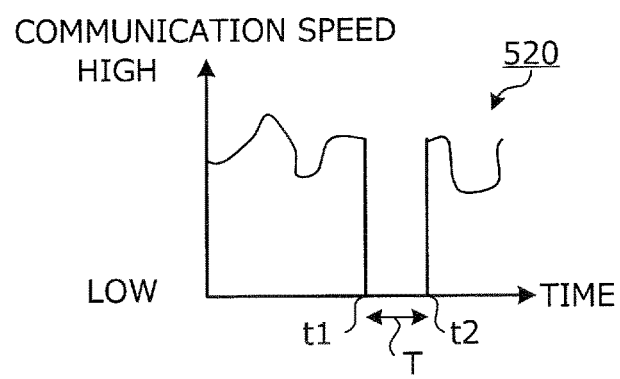

The given situation may be a situation in which the terminal #2 detects an interruption (cutoff) of communication with the terminal #1 (see, e.g., FIGS. 5A and 5B). An interruption of communication may be assumed to be a state when communication is interrupted for a given period or longer time, where an interruption of communication lasting for a period shorter than the given period is excluded. The terminal #2 does not have to be configured to be capable of detecting all of the above given situations but may be configured to be capable of detecting at least any one of the given situations.

When the given situation arises, the terminal #2 transfers (transmits) to the terminal #3 or #4 (third processing apparatus) among the terminals #1 to #4, task data that is a portion of the shared task data of the terminal #1 and saved by the terminal #2. For example, the terminal #2 transfers the task data of the terminal #1 to one of the terminals #3 and #4 that communicates with the terminal #1 at a higher speed. Among the terminals #1 to #4, the terminal #2 may transfer the task data to a terminal (data processing apparatus) that is communicating with the terminal #1, which is using the task data requiring memory sharing. In the example of FIG. 1B, the terminal #2 transfers to the terminal #4, task data that is task data of the terminal #1 and saved by the terminal #2.

The terminal #4 saves to the memory of the terminal #4, the received task data of the terminal #1 transferred from the terminal #2. The terminal #4 transmits to the terminal #1, a sharing start signal indicating that the terminal #4 saving the task data of the terminal #1 starts memory sharing with the terminal #1. As a result, the terminal #1 knows that the task data transmitted to the terminal #2 is saved by the terminal #4. When a need to access the task data transmitted to the terminal #2 arises in a task of the terminal #1, the terminal #1 communicates with the terminal #4 and thereby, accesses the task data saved in the memory of the terminal #4.

When the swap-out speed (writing speed) of data swap-out to the storage (auxiliary memory) of the terminal #1 is higher than, for example, the communication speed of communication with the terminals #2 to #4, the terminal #1 may swap out the data to the storage of the terminal #1 without transmitting the data to one of the terminals #2 to #4. In this manner, a shared portion of task data may be transmitted to a different terminal based on the result of comparison between communication speed and the speed of storing the task data to storage.

FIG. 1C depicts an example of a state table shared between terminals. A state table 130 of FIG. 1C represents an example of information shared among the terminals #1 to #4. The state table 130 indicates "communication speed", "relative positional distance change tendency", and "communication speed change tendency" between each pair of terminals making up the terminals #1 to #4. For example, a given terminal among the terminals #1 to #4, periodically measures the communication speed of communication between the given terminal and another terminal among the terminals #1 to #4 and the relative positional distance between the given terminal and the other terminal, and transmits/receives the result of measurement to/from the other terminal. In this manner, the terminals #1 to #4 share the state table 130.

"Relative positional distance change tendency" is information indicative of whether the relative positional distance has increased or decreased from the previously measured relative positional distance. For example, when the currently measured relative positional distance indicates an increase in the relative positional distance by a value greater than or equal to the threshold from the previously measured relative positional distance, "relative positional distance change tendency" is recorded as "increase". When the currently measured relative positional distance indicates a decrease in the relative positional distance by a value greater than or equal to the threshold from the previously measured relative positional distance, "relative positional distance change tendency" is recorded as "decrease".

The relative positional distance represents, for example, the distance between terminals. The distance between terminals can be determined by, for example, acquiring the positional coordinates of the given terminal and another terminal and performing calculation of the distance based on the acquired positional coordinates. The positional coordinate of the given terminal can be acquired, for example, using the global positioning system (GPS). The positional coordinate of the other terminal can be acquired, for example, by receiving information from the other terminal indicating the positional coordinate of the other terminal acquired by the other terminal through the GPS.

"Communication speed change tendency" is information indicative of whether the communication speed has increased or decreased from the previously measured communication speed. For example, when the currently measured communication speed indicates an increase in the communication speed by a value greater than or equal to the threshold from the previously measured communication speed, "communication speed change tendency" is recorded as "increase". When the currently measured communication speed indicates a decrease in the communication speed by a value greater than or equal to the threshold from the previously measured communication speed, "communication speed change tendency" is recorded as "decrease".

For example, when the terminal #1 detects a shortage of available memory thereof, the terminal 1 selects among other terminals, a terminal achieving the highest communication speed with the terminal 1, as a memory sharing request receiving terminal, based on the state table 130. For example, when B among A to E entered in the "communication speed" field of the state table 130 represents the highest communication speed, the terminal #1 transmits the task data thereof to the terminal #2 (see, e.g., FIG. 1A). In this manner, the terminal #1 may acquire the communication speed of communication with terminals connected to the terminal #1 and select a memory sharing request receiving terminal, based on the acquired communication speeds.

The state table 130 also indicates the connection relation between the terminals in the communication system 100. The state table 130 of FIG. 1C indicates that the terminals #1 to #4 are connected to each other.

FIG. 1D depicts an example of a change in the state table. In FIG. 1D, parts identical to those depicted in FIG. 1C are omitted in further description. When the terminal #1 and the terminal #2 are moved away from each other, the relative positional distance between the terminal #1 and the terminal #2 increases while the communication speed of communication between the terminal #1 and the terminal #2 decreases. Thus, the state table shared among the terminals #1 to #4 changes to, for example, the state table 130 of FIG. 1D. For example, "communication speed change tendency" between the terminal #1 and the terminal #2 is recorded as "decrease", "relative positional distance change tendency" between the terminal #1 and the terminal #2 is recorded as "increase", and the communication speed of communication between the terminal #1 and the terminal #2 is recorded as B' (B'<B).

Figure 2A:
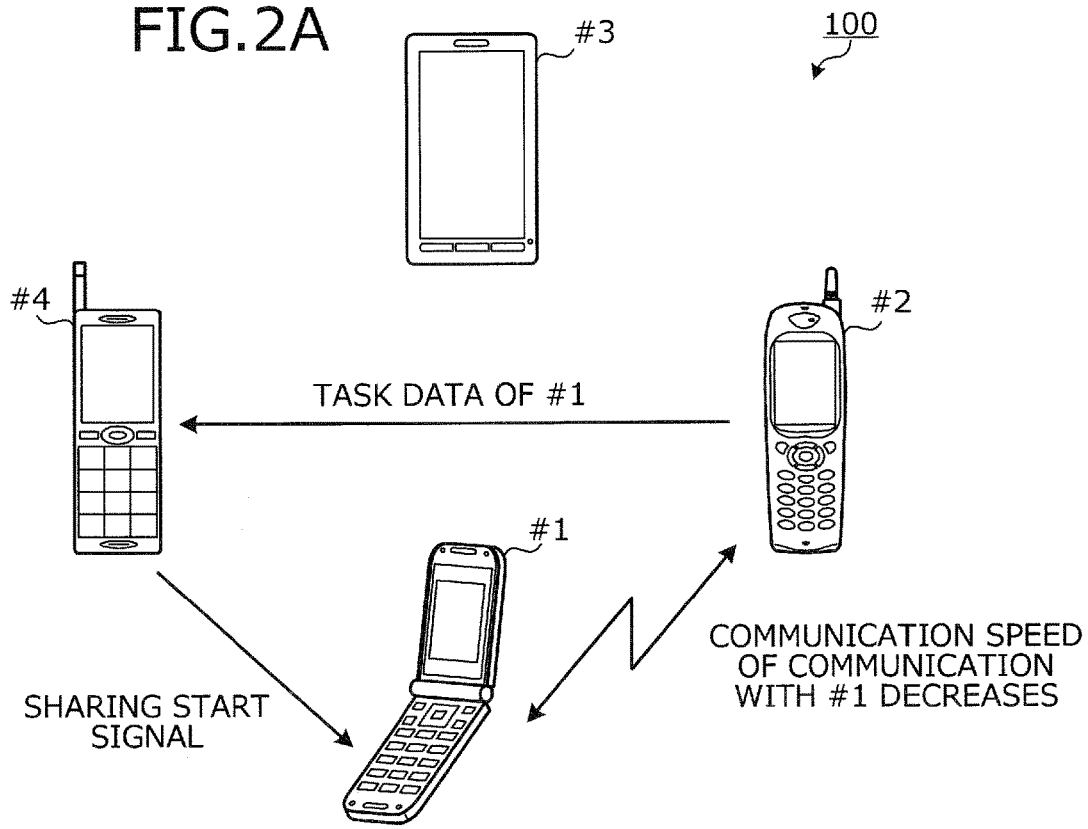
FIGS. 2A and 2B are diagrams of task data migration caused by a decrease in a communication speed.
Figure 2B:
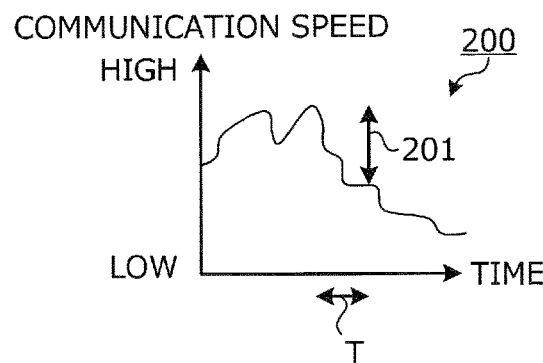

FIGS. 2A and 2B depict task data migration caused by a decrease in a communication speed. In FIG. 2A, components identical to those depicted in FIG. 1A are denoted by the same reference numerals used in FIG. 1A and are omitted in further description. A graph 200 depicted in FIG. 2B depicts an example of a change in the communication speed of communication between the terminal #1 and the terminal #2. In the graph 200, the horizontal axis represents time and the vertical axis represents communication speed.

A case is assumed where a decrease 201 of the communication speed of communication between the terminal #1 and the terminal #2 during a period T exceeds the threshold, as depicted in the graph 200. In this case, as depicted in FIG. 1D, "communication speed change tendency" between the terminal #1 and the terminal #2 is recorded as "decrease" in the state table 130.

Figure 3A:
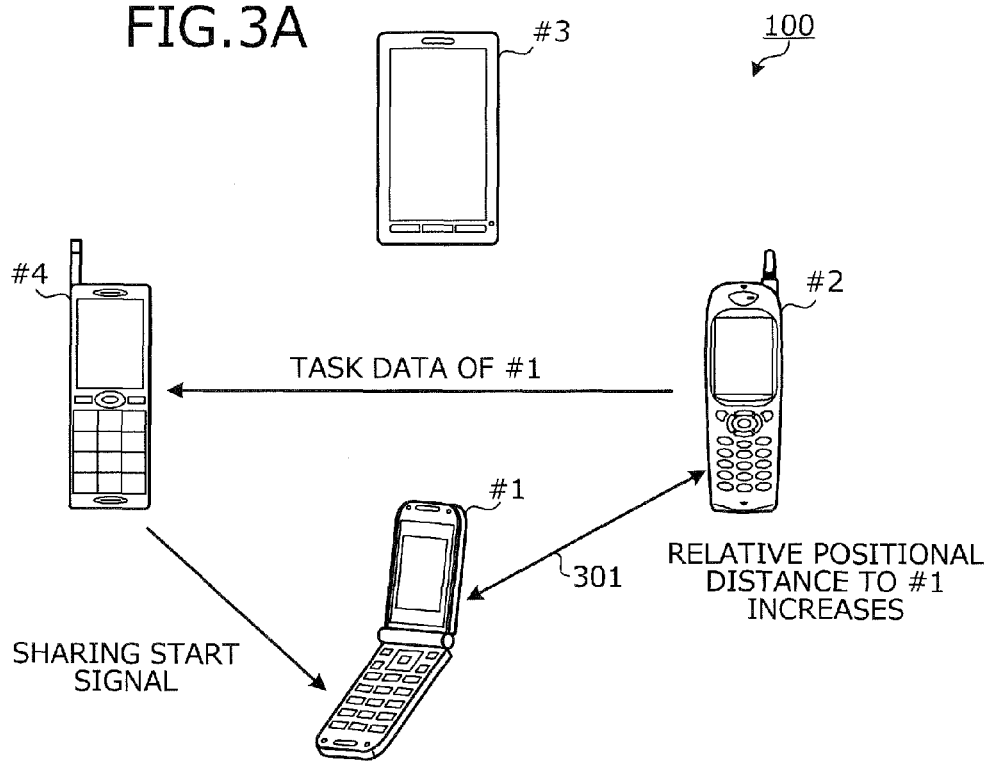
FIGS. 3A and 3B are diagrams of migration of task data caused by an increase in relative positional distance.
Figure 3B:
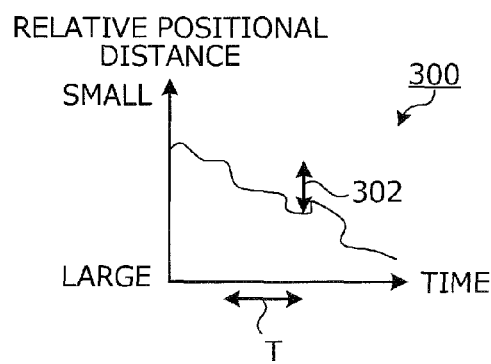

FIGS. 3A and 3B depict migration of task data caused by an increase in the relative positional distance. In FIG. 3A, components identical to those depicted in FIG. 1A are denoted by the same reference numerals used in FIG. 1A and are omitted in further description. A graph 300 depicted in FIG. 3B depicts an example of a change in the relative positional distance 301 between the terminal #1 and the terminal #2. In the graph 300, the horizontal axis represents time and the vertical axis represents the relative positional distance 301.

A case is assumed where an increase 302 of the relative positional distance 301 between the terminal #1 and the terminal #2 during the period T exceeds the threshold, as depicted in the graph 300. In this case, as depicted in FIG. 1D, "relative positional distance change tendency" between the terminal #1 and the terminal #2 is recorded as "increase" in the state table 130.

In this manner, for example, when a decrease of the communication speed of communication between the terminal #1 and the terminal #2 during a given period exceeds the threshold and an increase of the relative positional distance 301 (distance) between the terminal #1 and the terminal #2 during the given period exceeds the threshold, the terminal #2 transfers task data of the terminal #1 to a different terminal, enabling a case to prevented where the terminal #1 becomes unable to collect task data because of a decrease in the communication speed of communication between the terminal #1 and the terminal #2 and an increase in the relative positional distance 301 between the terminal #1 and the terminal #2.

FIGS. 4AA and 4AB are diagrams of task data migration caused by a shortage of remaining battery power. In FIG. 4AA, components identical to those depicted in FIG. 1A are denoted by the same reference numerals used in FIG. 1A and are omitted in further description. A graph 410 depicted in FIG. 4AB depicts an example of the remaining battery power 401 and transmission power 402 of the terminal #2. The transmission power 402 represents the approximate amount of power that is consumed by the terminal #2 when the task data of the terminal #1 is transmitted to another terminal (e.g., terminal #1). When a difference 403 between the transmission power 402 and the remaining battery power 401 becomes less than or equal to a threshold during memory sharing between the terminal 1 and the terminal 2, the terminal #2 transfers the task data of the terminal #1 to the terminal #4.

For example, correlation information indicative of the correlation between the volume of task data to be transmitted and the amount of power consumed for transmission of the task data (e.g., a function, table, etc.) is stored in the memory of the terminal #2. The correlation information indicates that, for example, the larger the volume of the task data to be transmitted, the larger the amount of power consumed for transmission of the task data.

The terminal #2 can determine the transmission power 402 by deriving the amount of power based on the volume of the task data of the terminal #1 saved by the terminal #2 and the correlation information. By using the volume of the task data of the terminal #1 saved by the terminal #2, the terminal #2 can determine the transmission power 402, which increases as the volume of the task data of the terminal #1 saved by the terminal #2 increases.

In this manner, the terminal #2 transfers the task data of the terminal #1 based on the remaining battery power 401 and the transmission power 402 that is consumed when the terminal #2 transmits the task data of the terminal #1, thereby enabling the terminal #2 to transfer the task data of the terminal #1 to another terminal before the remaining battery power for transmitting the task data of the terminal #1 in response to an access request from the terminal #1 is exhausted. As a result, a case is prevented where the terminal #1 becomes unable to collect the task data thereof because of insufficient remaining battery power of the terminal #2.

FIGS. 4BA and 4BB are diagrams of task data migration caused by a shortage of remaining battery power. In FIG. 4BA, components identical to those depicted in FIG. 4AA are denoted by the same reference numerals used in FIG. 4AA and are omitted in further description. A graph 420 depicted in FIG. 4BB depicts an example of the remaining battery power 401, the task power 404, and the transmission power 402 of the terminal #2. The task power 404 represents the approximate amount of power that is consumed by the terminal #2 to complete a task under execution. When a difference 405 between the sum of the task power 404 and transmission power 402 and the remaining battery power 401 becomes less than or equal to a threshold, the terminal #2 transfers the task data of the terminal #1 o the terminal #4.

For example, the amount of power consumed by the task under execution is stored in the memory of the terminal #2. The terminal #2 acquires the task power 404 by acquiring from the memory, the amount of power corresponding to the task under execution.

In this manner, the terminal #2 may transfer the task data of the terminal #1 based on the remaining battery power 401, the transmission power 402 that is consumed when the terminal #2 transmits the task data of the terminal #1, and the task power 404 that is consumed if the terminal #2 competes the task. Thus, the terminal #2 is able to transfer the task data of the terminal #1 to another terminal while reserving the remaining battery power for completing the task under execution, thereby enabling a case to be prevented where the terminal #2 becomes unable to complete the task under execution after transferring the task data of the terminal #1 to another terminal.

FIG. 5AA and 5AB are diagrams of task data migration caused by interruption of communication. In FIG. 5AA, components identical to those depicted in FIG. 1A are denoted by the same reference numerals used in FIG. 1A and are omitted in further description. A graph 510 depicted FIG. 5AB depicts an example of a change in the communication speed of communication between the terminal #1 and the terminal #2. A case is assumed where communication between the terminal #1 and the terminal #2 is interrupted at time t during memory sharing between the terminal #1 and the terminal #2, as depicted in the graph 510.

For example, the terminal #2 can detect an interruption of communication between the terminal #1 and the terminal #2 based on the communication speed of communication between the terminal #1 and the terminal #2. For example, when detecting an interruption of communication between the terminal #1 and the terminal #2, the terminal #2 transfers task data of the terminal #1 to where the terminal #1 becomes unable to collect the task data thereof because of an interruption of communication between the terminal #1 and the terminal #2.

FIGS. 5BA and 5BB are diagrams of task data migration caused by interruption of communication. In FIG. 5BA, components identical to those depicted in FIG. 1A are denoted by the same reference numerals used in FIG. 1A and are omitted in further description. A graph 520 depicted in FIG. 5BB depicts an example of a change in the communication speed of communication between the terminal #1 and the terminal #2. A case is assumed where communication between the terminal #1 and the terminal #2 is interrupted temporarily at time t1 during memory sharing between the terminal #1 and the terminal #2, as depicted in the graph 520.

It is assumed that communication between the terminal #1 and the terminal #2 is restored at time t2 at which a period T has elapsed since the time t1. Temporary interruption of communication between the terminal #1 and the terminal #2 occurs when, for example, when the terminal #1 or #2 temporarily go through a tunnel, temporarily blocking communication between the terminal #1 and the terminal #2.

For example, when detecting an interruption of communication between the terminal #1 and the terminal #2, the terminal #2 stands by for a given period and if communication between the terminal #1 and the terminal #2 is restored during stand-by, the terminal #2 does not transfer task data of the terminal #1. As a result, when communication between the terminal #1 and the terminal #2 is restored, memory sharing can be restarted without migration of the task data of the terminal #1 to the terminal #4, thereby suppressing increases in processes including a process of transferring the task data to the terminal #4.

If communication between the terminal #1 and the terminal #2 is not restored after the terminal #2 stands by for the given time, the terminal #2 transfers the task data of the terminal #1 to the terminal #4, as depicted in FIG. 5AA, thereby enabling a case to be prevented where the terminal #1 becomes unable to collect the task data thereof because of an interruption of communication between the terminal #1 and the terminal #2.

FIG. 6 depicts an example of a hardware configuration of the terminal. Each of the terminals #1 to #4 can be implemented by, for example, a data processing apparatus 600 depicted in FIG. 6. The data processing apparatus 600 includes a central processing unit 601, random access memory 602, storage 603, and a radio unit 604. The central processing unit 601, the random access memory 602, the storage 603, and the radio unit 604 are interconnected through a bus 620.

The central processing unit 601 supervises overall control over the data processing apparatus 600. The random access memory 602 is used as a work area of the central processing unit 601. The storage 603 is auxiliary memory that stores data under the control of the central processing unit 601. The radio unit 604 communicates with other terminals through a radio communication line. The radio unit 604 is provided as, for example, a radio LAN adaptor.

Figure 7:
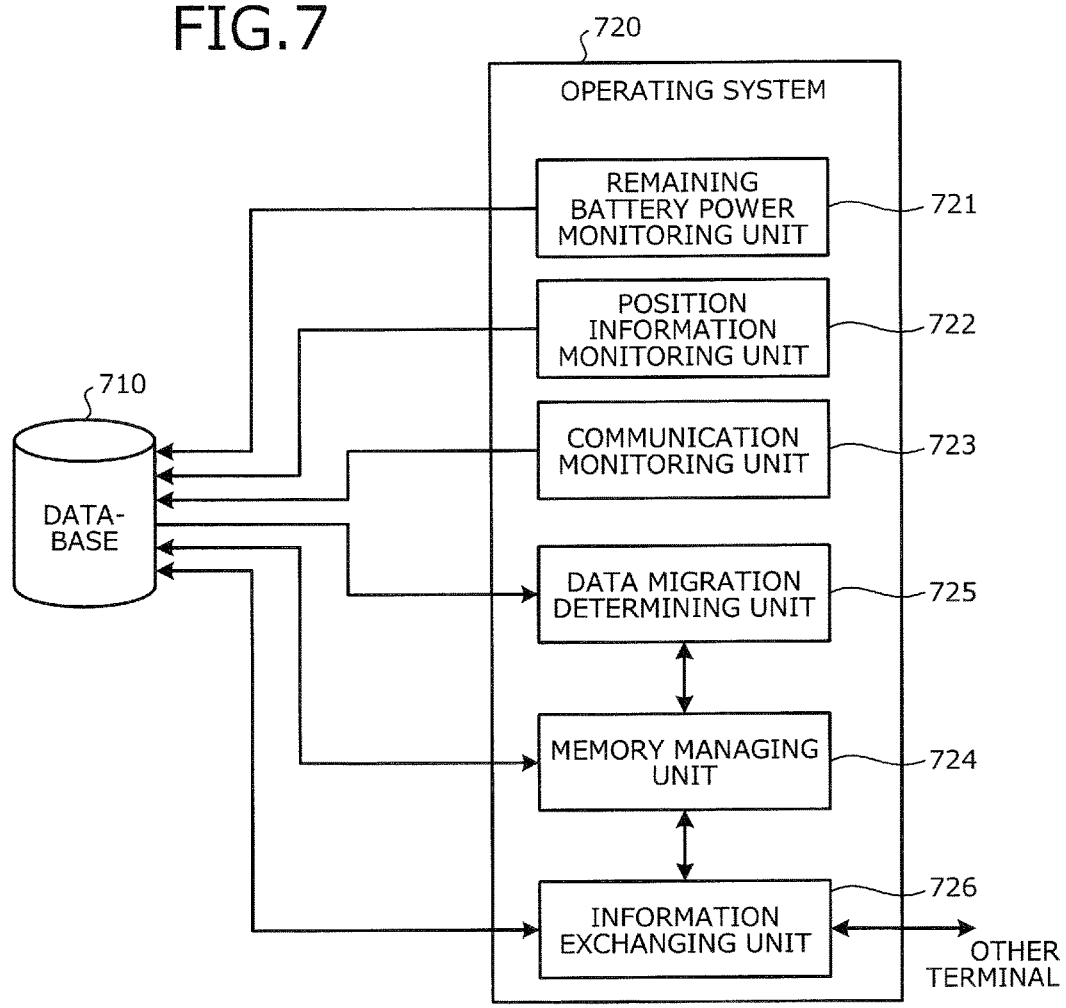
FIG. 7 is a block diagram an example of a functional configuration of the terminal.

FIG. 7 depicts an example of a functional configuration of the terminal. Each of the terminals #1 to #4 has, for example, a database 710 and an operating system 720 depicted in FIG. 7. The database 710 is stored in, for example, the random access memory 602 depicted in FIG. 6. The database 710 is the database that includes the state table 130 (see, e.g., FIGS. 1C and 1D), remaining battery power information that indicates the remaining battery power of a given terminal among the terminals #1 to #4, and memory use information that indicates task data of other terminals saved in the random access memory 602 of the given terminal.

The operating system 720 is implemented when the central processing unit 601 of FIG. 6 executes a program using the random access memory 602 as a work area. The operating system 720 has functions of a remaining battery power monitoring unit 721, a position information monitoring unit 722, a communication monitoring unit 723, a memory managing unit 724, a data migration determining unit 725, and an information exchanging unit 726.

The remaining battery power monitoring unit 721, the position information monitoring unit 722, and the communication monitoring unit 723 monitor the state of the given terminal and update the database 710 based on the result of the monitoring. For example, the remaining battery power monitoring unit 721 is a remaining battery power monitoring unit that monitors the remaining battery power of the given terminal and that updates the database 710 based on the result of the monitoring.

The position information monitoring unit 722 monitors the relative positional distance between the given terminal and other terminals, and updates an entry to the "relative positional distance change tendency" field of the state table 130 of the database 710, based on the result of the monitoring. The communication monitoring unit 723 monitors the communication speed of communication between the given terminal and other terminals, and updates entries to the "communication speed" field and the "communication speed change tendency" field of the state table 130 of the database 710, based on the result of the monitoring.

The memory managing unit 724 is a memory managing unit that manages the volume of the random access memory 602 of the given terminal. The memory managing unit 724 communicates with other terminals via the information exchanging unit 726 and thereby, manages memory sharing with the other terminals. For example, when the random access memory 602 of the given terminal has insufficient available memory, the memory managing unit 724 manages memory sharing to save task data of the given terminal at another terminal.

For example, the memory managing unit 724 detects an insufficiency of the random access memory 602. Upon detecting the insufficiency of the random access memory 602, the memory managing unit 724 requests the data migration determining unit 725 to determine a memory sharing request receiving terminal (another terminal whose memory is used). Upon receiving the result of determination of the request receiving terminal sent from the data migration determining unit 725, the memory managing unit 724 performs memory sharing with the request receiving terminal indicated by the received result.

For example, the memory managing unit 724 transmits to the request receiving terminal, a memory-providing request signal requesting provision of memory and receives a response signal sent from the request receiving terminal in response to the transmitted memory-providing request signal. Upon receiving a response signal indicating that memory can be provided, the memory managing unit 724 transmits task data of the given terminal to the request receiving terminal. The response signal indicating that memory can be provided may include information of the amount of memory that can be provided. In such a case, the memory managing unit 724 transmits to the request receiving terminal, task data of a volume equal to the volume indicated by the response signal.

When a need to access the task data transmitted to the request receiving terminal arises, the memory managing unit 724 communicates with the request receiving terminal and thereby, accesses the task data in the memory of the request receiving terminal.

If the random access memory 602 of the given terminal has available memory and another terminal makes a request for the provision of memory, the memory managing unit 724 manages memory sharing for saving task data of the other terminal in the random access memory 602 of the given terminal. For example, the memory managing unit 724 receives a memory-providing request signal that requests the provision of memory and that is sent from a request sending terminal. If the random access memory 602 of the given terminal has no available memory, the memory managing unit 724 transmits to the request sending terminal, a response signal indicating that memory cannot be provided.

If the random access memory 602 of the given terminal has available memory, the memory managing unit 724 transmits to the request sending terminal, a response signal indicating that memory can be provided. The response signal indicating that memory can be provided may include information of the amount of memory that can be provided. The memory managing unit 724 receives task data transmitted from the request sending terminal and saves the received task data in the random access memory 602 of the given terminal.

The memory managing unit 724 updates the memory use information stored in the database 710 while executing the memory sharing process. The memory use information includes information that indicates task data of other terminals saved in the random access memory 602 of the given terminal. The memory use information also includes information that indicates other terminals (request receiving terminals) that save task data of the given terminal.

If the memory managing unit 724 receives task data of another terminal sent from yet another terminal, the memory managing unit 724 transmits to the sender terminal having originally transmitted the received task data, a sharing start signal indicating the start of memory sharing. For example, in the state depicted in FIG. 1B, when the memory managing unit 724 of the terminal #4 receives task data of the terminal #1 sent from the terminal #2, the memory managing unit 724 transmits a sharing start signal to the terminal #1.

The data migration determining unit 725 is a data migration determining unit that detects the relative positional distance of the given terminal to a terminal that sent a memory sharing request and monitors the communication speed of communication with the terminal that sent the memory sharing request. If the data migration determining unit 725 receives a request from the memory managing unit 724 to determine a memory sharing request receiving terminal, the data migration determining unit 725 determines a terminal that is to receive a memory sharing request. The memory sharing request receiving terminal can be determined based on, for example, "communication speed", etc., indicated by the state table 130. If a situation arises in which the data migration determining unit 725 may become unable to transmit task data received from another terminal and saved by the given terminal, to the sender terminal because of a change in the state of the given terminal, the data migration determining unit 725 transmits the saved task data to another terminal.

For example, the data migration determining unit 725 determines migration of task data of another terminal to yet another terminal, based on "relative positional distance change tendency" and "communication speed change tendency" indicated in the state table 130 stored in the database 710. The data migration determining unit 725 may determine migration of task data of another terminal to yet another terminal, based on the remaining battery power information, etc., stored in the database 710.

When determining migration of task data of another terminal to yet another terminal, the data migration determining unit 725 determines the terminal to receive the migrated task data, based on, for example, "communication speed", etc., indicated in the state table 130. When determining migration of task data of another terminal to yet another terminal, the data migration determining unit 725 requests the memory managing unit 724 to migrate the task data of the other terminal to yet another terminal.

The information exchanging unit 726 relays for communication between the memory managing unit 724 and other terminals. For example, the information exchanging unit 726 relays a memory-providing request signal, a response signal, task data, a sharing start signal, etc., exchanged between the memory managing unit 724 and other terminals.

The information exchanging unit 726 monitors the state table 130 of the database 710, and when the contents of the state table 130 are updated, transmits the updated contents to another terminal. The information exchanging unit 726 receives the updated contents of the state table 130 of another terminal sent from the other terminal and updates the state table 130 of the given terminal based on the received updated contents. The information exchanging unit 726 communicates with other terminals, for example, through the radio unit 604 of FIG. 6.

Figure 8A:
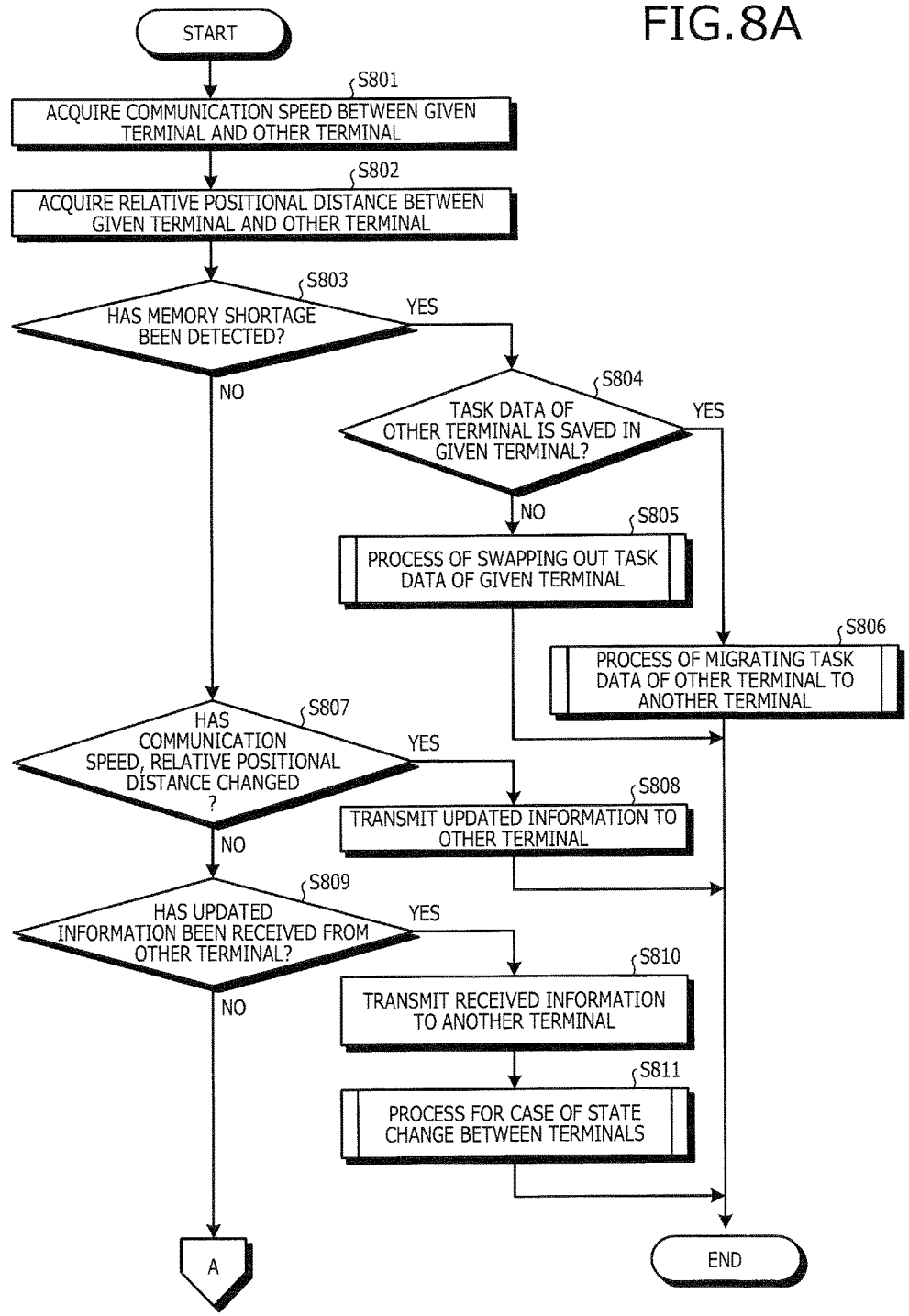

FIGS. 8A and 8B are flowcharts of an example of a process by the operating system. For example, the operating system 702 of the terminal #1 repeatedly executes operations depicted in FIGS. 8A and 8B. A process by the terminal #1 will be described; the process is also executed by each of the terminals #2 to #4 in the same manner.

As depicted in FIG. 8A, the communication monitoring unit 723 acquires the communication speed of communication between a given terminal (terminal #1) and another terminal (terminals #2 to #4) (step S801). Subsequently, the position information monitoring unit 722 acquires the relative positional distance between the given terminal and the other terminal (step S802).

The memory managing unit 724 then determines memory shortage of the given terminal (random access memory 602 is insufficient) has been detected (step S803). If memory shortage of the given terminal has been detected (step S803: YES), the memory managing unit 724 determines whether task data of the other terminal is saved in the random access memory 602 of the given terminal (step S804). The determination at step S804 can be made based on, for example, the memory use information in the database 710.

At step S804, if the task data of the other terminal is not saved (step S804: NO), the given terminal executes a process of swapping out task data of the given terminal to the storage 603 of the given terminal or to the other terminal (step S805), and ends the series of operations. The process of swapping out the task data of the given terminal will be described later (see, e.g., FIG. 9).

At step S804, if the task data of the other terminal is saved (step S804: YES), the given terminal executes a process of migrating the saved task data of the other terminal to yet another terminal (step S806), and ends the series of operations. The process of migrating the task data of the other terminal to yet another terminal when memory shortage is detected will be described later (see, e.g., FIG. 10).

At step S803, if no memory shortage of the given terminal is detected (step S803: NO), the given terminal proceeds to step S807, at which the information exchanging unit 726 determines whether at least either of the communication speed and the relative positional distance acquired at steps S801 and S802 has changed from the previously measured communication speed or the relative positional distance (step S807). The determination at step S807 can be made, for example, based on the state table 130 (see, e.g., FIGS. 2 and 3).

At step S807, if at least either of the communication speed and the relative positional distance has changed (step S807: YES), updated information is transmitted to the other terminal (step S808). As a result, at least a change in either of the communication speed and the relative positional distance detected by the given terminal can be reflected in the state table 130 of the other terminal. Subsequently, the given terminal proceeds to step S811.

At step S807, when neither the communication speed nor the relative positional distance has changed (step S807: NO), the data migration determining unit 725 determines whether updated information has been received from the other terminal (step S809). If updated information has been from the other terminal (step S809: YES), the migration determining unit 725 transmits the received updated information to another terminal that has not received the updated information yet (step S810). As a result, the contents of the received updated information from the other terminal can be reflected in the state table 130 of another terminal. The given terminal then executes a process for a case of a state change between terminals (step S811), and ends the series of operations. The process for a case of a state change between terminals will be described later (see, e.g., FIG. 11).

At step S809, if updated information has not been received from the other terminal (step S809: NO), the given terminal proceeds to operations depicted in FIG. 8B (starting from reference numeral A). The memory managing unit 724 determines whether a memory-providing request signal has been received from the other terminal (step S812). If a memory-providing request signal has been received from the other terminal (step S812: YES), the memory managing unit 724 executes a process of responding to the received memory-providing request signal (step S813), and ends the series of operations. The process of responding to the memory-providing request signal will be described later (see, e.g., FIG. 12).

At step S812, if no memory-providing request signal has been from the other terminal (step S812: NO), the data migration determining unit 725 determines whether remaining battery power has decreased (step S814). The determination at step S814 can be made for example, based on the remaining battery power information in the database 710 (see, e.g., FIGS. 4A and 4B). If the remaining battery power has decreased (step S814: YES), the given terminal executes a process for a case of a decrease in the remaining battery power (step S815), and ends the series of operations. The process for a case of a decrease in the remaining battery power will be described later (see, e.g., FIG. 13).

At step S814, if the remaining battery power has not decreased (step S814: NO), the memory managing unit 724 determines whether a sharing start notification signal has been received from the other terminal (step S816). If a sharing start notification signal has been received from the other terminal (step S816: YES), the memory managing unit 724 updates the memory use information in the database 710 (step S817), and ends the series of operations.

At step S816, if no sharing start notification signal has been received from the other terminal (step S816: NO), the memory managing unit 724 determines whether a need to access the task data of the given terminal has arisen in a task of the given terminal (step S818). The task data of the given terminal includes not only task data saved in the random access memory 602 of the given terminal but also task data transmitted to the other terminal by the memory sharing process.

At step S818, if a need to access the task data of the given terminal has arisen (step S818: YES), the terminal #1 executes a process for a case of an arising access need (step S819), and ends the series of operations. The process for the case of an arising access need will be described later (see, e.g., FIG. 14). If no need of accessing the task data of the given terminal has arisen (step S818: NO), the data migration determining unit 725 determines whether interruption of communication with the other terminal has been detected (step S820). The determination at step S820 can be made, for example, based on the state table 130 (see, e.g., FIGS. 5A and 5B).

At step S820, if interruption of communication with the other terminal has been detected (step S820: YES), the given terminal executes a process for a case of detection of communication interruption (step S821), and ends the series of operations. The process for a case of detection of communication interruption will be described later (see, e.g., FIG. 15). If no interruption of communication with the other terminal has been detected (step S820: NO), the given terminal ends the series of operations.

Through the above steps, each of the terminals #1 to #4 can save therein the task data of other terminals, can cause another terminal to save the task data of the terminal, or migrate task data of other terminals to another terminal among the terminals #1 to 4, according to a given situation.

Figure 9:
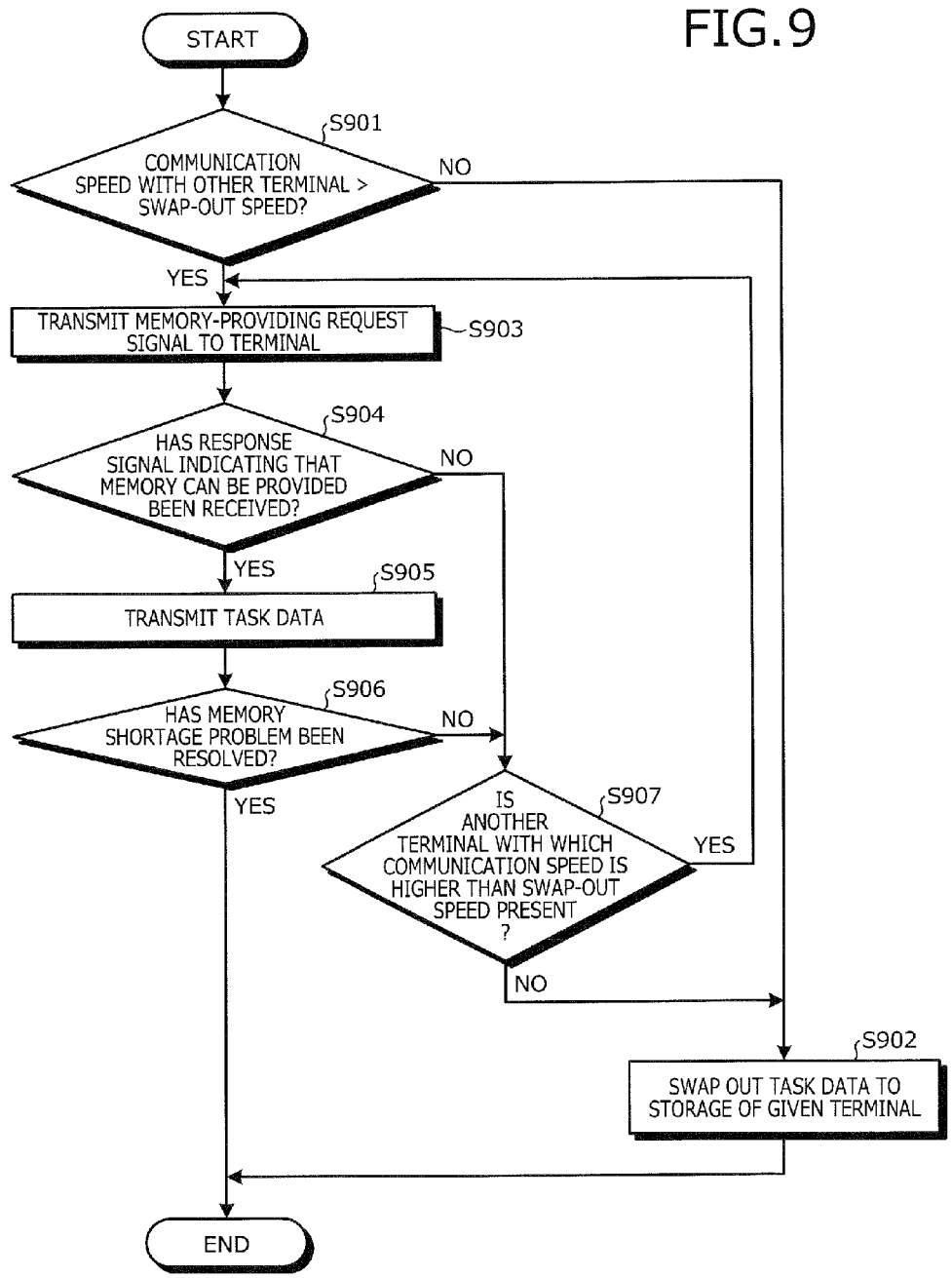
FIG. 9 is a flowchart of an example of a process of swapping out task data of a given terminal.

FIG. 9 depicts an example of a process of swapping out task data of a given terminal. At step S805 of FIG. 8A, the operating system 720 of a given terminal (terminal #1) executes, for example, steps of FIG. 9. First, the memory managing unit 724 determines whether the communication speed of communication between the given terminal (terminal #1) and another terminal (terminals #2 to #4) is higher than the swap-out speed (writing speed) of swapping out task data to the storage 603 of the given terminal (step S901).

The communication speed of communication between the given terminal and another terminal is, for example, the highest communication speed among communication speeds indicated in the state table 130 of the database 710. The swap-out speed of swap-out to the storage 603 of the given terminal is, for example, a fixed value stored in advance in the storage 603, etc.

At step S901, if the communication speed of communication with another terminal is less than or equal to the swap-out speed (step S901: NO), the memory managing unit 724 swaps out the task data of the given terminal to the storage 603 of the given terminal (step S902), and ends the series of operations. If the communication speed of communication with another terminal is higher than the swap-out speed (step S901: YES), the memory managing unit 724 transmits a memory-providing request signal to the terminal (step S903).

At step S903, the memory managing unit 724 requests the data migration determining unit 725 to determine another terminal whose memory is to be used, and transmits a memory-providing request signal to the terminal determined in response to the request from the memory managing unit 724. The terminal (request receiving terminal) to which the memory-providing request signal is transmitted first is, for example, the terminal achieving the highest communication speed in communication with the terminal #1, among the terminal #2 to #4.

The memory managing unit 724 then determines whether a response signal indicating that memory can be provided has been received in response to the memory-providing request signal transmitted at step S903 (step S904). If a response signal indicating that memory can be provided has been received (step S904: YES), the memory managing unit 724 transmits the task data of the given terminal to the request receiving terminal (step S905). As a result, the given terminal can swap out the task data of the given terminal to the request receiving terminal.

The memory managing unit 724 then determines whether a memory shortage problem has been resolved by swap-out of the task data (step S906). Whether a memory shortage problem has been resolved can be determined based on a determination of whether the available memory in the random access memory 602 of the given terminal becomes greater than or equal to a threshold. If the memory shortage problem has been resolved (step S906: YES), the terminal #1 ends the series of operations. If the memory shortage problem has not been resolved (step S906: NO), the terminal #1 proceeds to step S907.

At step S904, if no response signal indicative of allowed memory sharing is received (step S904: NO), the data migration determining unit 725 determines whether another terminal whose communication speed of communication with the given terminal is higher than the swap-out speed is present (step S907). The determination at step S907 can be made, for example, based on the state table 130.

At step S907, if another terminal whose communication speed of communication with the given terminal is higher than the swap-out speed is not present (step S907: NO), the terminal #1 proceeds to step S902, at which the given terminal swaps out the task data residing in the given terminal to the storage 603 of the given terminal. If another terminal whose communication speed of communication with the given terminal is higher than the swap-out speed is present (step S907: YES), the given terminal returns to step S903. In this case, the memory managing unit 724 transmits a memory-providing request signal to the terminal whose communication speed of communication with the given terminal is higher than the swap-out speed.

Through the above steps, the terminal #1 can swap out the task data thereof to the storage 603 thereof or to another terminal. As a result, available memory in the random access memory 602 of the terminal #1 can be increased.

FIG. 10 is a flowchart of an example of a process of migrating task data of another terminal to yet another terminal when memory shortage occurs. At step S806 in FIG. 8A, the operating system 720 of a given terminal (terminal #1) executes, for example, operations depicted in FIG. 10. First, the memory managing unit 724 determines whether another terminal connected to a request sending terminal that has sent a request for memory sharing for task data saved in the given terminal is present (step S1001). The determination at step S1001 can be made, for example, based on the state table 130.

At step S1001, if no other terminal connected to the request sending terminal is present (step S1001: NO), the memory managing unit 724 transmits the saved task data to the request sending terminal (step S1002), and ends the series of operations. In this manner, the task data is returned to the request sending terminal to increase the available memory in the random access memory 602 of the given terminal.

At step S1001, if another terminal connected to the request sending terminal is present (step S1001: YES), the memory managing unit 724 transmits a memory-providing request signal to the terminal (request receiving terminal) connected to the request sending terminal (step S1003). The memory managing unit 724 then determines whether a response signal indicating that memory can be provided has been received in response to the memory-providing request signal transmitted at step S1003 (step S1004).

At step S1004, if a response signal indicating that memory can be provided has been received (step S1004: YES), the memory managing unit 724 migrates the task data of another terminal saved by the given terminal, to the request receiving terminal to which the memory-providing request signal is transmitted at step S1003 (step S1005). In this manner, the terminal #1 can swap out task data of another terminal to yet another terminal.

Subsequently, the memory managing unit 724 determines whether a memory shortage problem has been resolved by swap-out of the task data at step S1005 (step S1006). If the memory shortage problem has been resolved (step S1006: YES), the terminal #1 ends the series of operations. If the memory shortage problem has not been resolved (step S1006: NO), the terminal #1 proceeds to step S1007.

At step S1004, if no response signal indicating that memory can be provided is received (step S1004: NO), the data migration determining unit 725 determines whether another terminal connected to the request sending terminal is present (step S1007). The determination at step S1007 can be made, for example, based on the state table 130.

At step S1007, if no other terminal connected to the request sending terminal is present (step S1007: NO), the given terminal proceeds to step S1002, at which the given terminal returns the saved task data to the request sending terminal. If another terminal connected to the request sending terminal is present (step S1007: YES), the given terminal returns to step S1003. In this case, the memory managing unit 724 transmits a memory-providing request signal to the other terminal connected to the request sending terminal.

Through the above steps, the terminal #1 can migrate task data of another terminal to yet another terminal when memory shortage occurs. As a result, the amount of memory used at the terminals #1 to #4 is distributed among the terminals #1 to #4, which suppresses the occurrence of memory shortages at each terminal. If no terminal to which task data is to be migrated is present, the terminal #1 can return the task data to the terminal that requested memory sharing.

FIG. 11 is a flowchart of an example of a process for a case of a state change between terminals. At step S811 in FIG. 8A, the operating system 720 of a given terminal (terminal #1) executes, for example, of the operations depicted in FIG. 11. First, the data migration determining unit 725 determines whether task data of another terminal is saved in the random access memory 602 of the given terminal (step S1101). The determination at step S1101 can be made, for example, based on the memory use information in the database 710

At step S1101, if the task data of another terminal is not saved (step S1101: NO), the given terminal ends the series of operations. If the task data of another terminal is saved (step S1101: YES), the given terminal proceeds to step S1102, at which the data migration determining unit 725 determines whether the relative positional distance to a request sending terminal having sent a request for memory sharing for the saved task data is increasing and the communication speed of communication with the request sending terminal is decreasing (step S1102). The determination at step S1102 can be made, for example, based on the state table 130.

At step S1102, if the relative positional distance to the request sending terminal is not increasing and the communication speed of communication with the request sending terminal is not decreasing (step S1102: NO), the given terminal ends the series of operations. If the relative positional distance to the request sending terminal is increasing and the communication speed of communication with the request sending terminal is decreasing (step S1102: YES), the data migration determining unit 725 determines whether another terminal connected to the request sending terminal is present (step S1103). The determination at step S1103 can be made, for example, based on the state table 130.

At step S1103, if no other terminal connected to the request sending terminal is present (step S1103: NO), the given terminal ends the series of operations. If another terminal connected to the request sending terminal is present (step S1103: YES), the given terminal proceeds to step S1104, at which the data migration determining unit 725 determines whether the communication speed of communication between the terminal connected to the request sending terminal and the request sending terminal is higher than the communication speed of communication between the given terminal and the request sending terminal (step S1104). The determination at step S1104 can be made, for example, based on the state table 130.

At step S1104, if the communication speed of communication between the terminal and the request sending terminal is not higher than the communication speed of communication between the given terminal and the request sending terminal (step S1104: NO), the data migration determining unit 725 returns to step S1103, at which the data migration determining unit 725 determines whether another terminal connected to the request sending terminal is present. If the communication speed of communication between the terminal and the request sending terminal is higher than the communication speed of communication between the given terminal and the request sending terminal (step S1104: YES), the memory managing unit 724 transmits a memory-providing request signal to the terminal connected to the request sending terminal (step S1105).

The memory managing unit 724 then determines whether a response signal indicating that memory can be provided has been received in response to the memory-providing request signal transmitted at step S1105 (step S1106). If no response signal indicating that memory can be provided has been received (step S1106: NO), the data migration determining unit 725 returns to step S1103, at which the data migration determining unit 725 determines whether another terminal connected to the request sending terminal is present.

At step S1106, if a response signal indicating that memory can be provided has been received (step S1106: YES), the memory managing unit 724 transmits the task data saved by the given terminal to the terminal to which the memory-providing request signal has been transmitted (step S1107), and ends the series of operations. In this manner, the terminal #1 can swap out task data of another terminal to yet another terminal.

Through the above steps, when the state of communication between the terminal #1 and a terminal that has requested memory sharing deteriorates, the terminal #1 can migrate task data of the terminal that requested sharing to another terminal connected to the terminal that requested sharing, thereby enabling a case to be prevented where the terminal that requested sharing becomes unable to collect the task data.

FIG. 12 is a flowchart of an example of a response process of responding to a memory-providing request signal. At step S813 of FIG. 8B, the operating system 720 of a given terminal (terminal #1) executes, for example, of the operations depicted in FIG. 12. First, the memory managing unit 724 determines whether the memory of the given terminal (random access memory 602) can be provided (step S1201). The determination at step S1201 can be made, for example, based on the memory use information and remaining battery power information in the database 710.

For example, the memory managing unit 724 determines that the memory of the given terminal can be provided when the available memory in the random access memory 602 of the given terminal and the amount of remaining battery power of the given terminal are each higher than respective thresholds. The memory managing unit 724 determines that the memory of the given terminal cannot be provided when the available memory in the random access memory 602 of the given terminal is less than or equal to a threshold or the amount of remaining battery power of the given terminal is less than or equal to a threshold.

At step S1201, if the memory of the given terminal cannot be provided (step S1201: NO), the memory managing unit 724 transmits to a request sending terminal, a response signal indicating that the memory of the given terminal cannot be provided (step S1202), and ends the series of operations. The request sending terminal is a terminal that has transmitted a memory-providing request signal.

At step S1201, if the memory of the given terminal can be provided (step S1201: YES), the memory managing unit 724 transmits to the request sending terminal, a response signal indicating that the memory of the given terminal can be provided (step S1203). The response signal transmitted at step S1203 may include information indicative of the amount of memory that can be provided.

Subsequently, the memory managing unit 724 receives task data from the request sending terminal (step S1204). The memory managing unit 724 then transmits a sharing start signal giving notification of the start of memory sharing to the request sending terminal (step S1205), and ends the series of operations.

Through the above steps, when the terminal #1 receives a memory-providing request signal from a terminal, the terminal #1 can start memory sharing with the request sending terminal if the random access memory 602 of the terminal #1 can be provided.

FIG. 13 is a flowchart of an example of a process for the case of a decrease in remaining battery power. At step S815 of FIG. 8B, the operating system 720 of a given terminal (terminal #1) executes, for example, of the operations depicted in FIG. 13. First, the memory managing unit 724 determines whether task data of another terminal is saved in the random access memory 602 of the given terminal (step S1301). The determination at step S1301 can be made, for example, based on the memory use information in the database 710.

At step S1301, if the task data of another terminal is not saved in the random access memory 602 (step S1301: NO), the given terminal ends the series of operations. If the task data of another terminal is saved in the random access memory 602 (step S1301: YES), the data migration determining unit 725 determines whether another terminal connected to the request sending terminal is present (step S1302). The determination at step S1302 can be made, for example, based on the state table 130.

At step S1302, if another terminal connected to the request sending terminal is not present (step S1302: NO), the given terminal ends the series of operations. If another terminal connected to the request sending terminal is present (step S1302: YES), the memory managing unit 724 transmits a memory-providing request signal to the terminal connected to the request sending terminal (step S1303).

The memory managing unit 724 then determines whether a response signal indicating that memory can be provided has been received in response to the memory-providing request signal transmitted at step S1303 (step S1304). If no response signal indicating that memory can be provided is received (step S1304: NO), the data migration determining unit 725 returns to step S1302, at which the data migration determining unit 725 determines whether another terminal connected to the request sending terminal is present.

At step S1304, if a response signal indicating that memory can be provided has been received (step S1304: YES), the memory managing unit 724 transmits the saved task data to the request receiving terminal (step S1305), and ends the series of operations. The request receiving terminal to which the task data is transmitted is the terminal to which the memory-providing request signal is transmitted.

Through the above steps, when remaining battery power decreases, the terminal #1 can migrate the task data of a request sending terminal to another terminal connected to the request sending terminal, thereby enabling a case to be prevented where the memory sharing request sending terminal becomes unable to collect the task data.

FIG. 14 is a flowchart of an example of a process for the case of an arising access need. At step S819 of FIG. 8B, the operating system 720 of a given terminal (terminal #1) executes, for example, of the operations depicted in FIG. 14. First, the memory managing unit 724 determines whether the given terminal has saved task data that is to be accessed (step S1401). The determination at step S1401 can be made, for example, based on the memory use information in the database 710. If the given terminal has saved the task data (step S1401: YES), the given terminal accesses the task data saved by the given terminal (step S1402), and ends the series of operations.

At step S1401, if the given terminal has not saved the task data (step S1401: NO), the memory managing unit 724 determines whether accessing the memory of another terminal that has saved the task data (memory sharing request receiving terminal) is possible (step S1403). The terminal that has saved the task data can be identified based on, for example, the memory use information in the database 710. If accessing the memory of the terminal that has saved the task data is possible (step S1403: YES), the given terminal accesses the memory of the terminal (step S1404), and ends the series of operations.

At step S1403, of accessing the memory of the terminal is not possible (step S1403: NO), the given terminal stands by for a given period (step S1405). The memory managing unit 724 then determines again whether accessing the memory of the terminal that has saved the task data is possible (step S1406).

At step S1406, if accessing the memory of the terminal is possible (step S1406: YES), the terminal #1 proceeds to step S1404. If accessing the memory of the terminal is not possible (step S1406: NO), the terminal #1 starts a task process for accessing the task data from the initial state (step S1407), and ends the series of operations. In this case, when accessing the terminal that has stored the task data becomes possible, the terminal #1 may execute a process of causing the terminal to discard the task data saved by the terminal for the given terminal and end the memory sharing.

Through the above steps, when a need of accessing task data of the given terminal (terminal #1) arises, the given terminal can access the task data saved in the given terminal or at a different terminal. If access to the terminal that has saved the task data of the given terminal, is not possible, the given terminal stands by for a given period and then tries to access the terminal again. When becoming able to access the different terminal, the given terminal accesses the task data in the terminal. In this manner, even if the terminal #1 becomes temporarily unable to access a terminal that has stored the task data of the given terminal, the terminal #1 can eventually access the task data.

FIG. 15 is a flowchart of an example of a process for the case of detection of communication interruption. At step S821 of FIG. 8B, the operating system 720 of a given terminal (terminal #1) executes, for example, of the operations depicted in FIG. 15. First, the memory managing unit 724 determines whether the terminal #1 has saved task data of another terminal with which communication has been interrupted (step S1501). The determination at step S1501 can be made, for example, based on the memory use information in the database 710. If the task data of another terminal with which communication has been interrupted has not been saved (step S1501: NO), the given terminal ends the series of operations.

At step S1501, if the task data of another terminal (request sending terminal) with which communication has been interrupted has been saved (step S1501: YES), the terminal #1 stands by for a given period (step S1502). The data migration determining unit 725 then determines whether the interrupted communication has been restored (step S1503). If the interrupted communication has been restored (step S1503: YES), the terminal #1 ends the series of operations.

At step S1503, if the interrupted communication has not been restored (step S1503: NO), the data migration determining unit 725 determines whether another terminal connected to the request sending terminal is present (step S1504). The determination at step S1504 can be made, for example, based on the state table 130.

At step S1504, if no other terminal connected to the request sending terminal is present (step S1504: NO), the terminal #1 ends the series of operations. If another terminal connected to the request sending terminal is present (step S1504: YES), the memory managing unit 724 transmits a memory-providing request signal to the terminal connected to the request sending terminal (step S1505).

The memory managing unit 724 then determines whether a response signal indicating that memory can be provided has been received in response to the memory-providing request signal transmitted at step S1505 (step S1506). If a response signal indicating that memory can be provided has not been received (step S1506: NO), the data migration determining unit 725 returns to step S1504, at which the data migration determining unit 725 determines whether another terminal connected to the request sending terminal is present.

At step S1506, if a response signal indicating that memory can be provided has been received (step S1506: YES), the memory managing unit 724 transmits the saved task data to the terminal (step S1507), and ends the series of operations. The task data is transmitted to the terminal to which the memory-providing request signal is transmitted.

Through the above steps, when communication between the terminal #1 and a request sending terminal that has requested memory sharing is interrupted, the terminal #1 can migrate the task data of the request sending terminal to another terminal connected to the request sending terminal, thereby enabling a case to be prevented where the memory sharing request sending terminal becomes unable to collect the task data. Even if communication with the memory sharing request sending terminal is interrupted, the terminal #1 does not migrate the task data when the interrupted communication is restored within a given period. As a result, an increase in processes to be executed, including task data migration, can be suppressed.

As described above, according to the data sharing method and the data processing system, to prevent a case where data temporarily saved in a given terminal by the memory sharing process cannot be returned to a request sending terminal, the given terminal can migrate the saved data to another terminal based on the result of detection of the state of the given terminal and a change in a communication environment. As a result, the process based on memory sharing can be executed in a more stable manner between radio terminals, where the state of the given terminal and the communication environment change dynamically.

According to one aspect of the present embodiments, an effect of stabilizing a process that is performed by memory sharing is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A data sharing method comprising:
first transmitting, by a second data processing apparatus from among a plurality of data processing apparatuses that share data, a data to a first data processing apparatus from among the plurality of data processing apparatuses;
deleting, by the second data processing apparatus, the data from a memory of the second data processing apparatus;
detecting, by the first data processing apparatus, any one among a shortage of available memory of the first data processing apparatus, a change in remaining battery power of the first data processing apparatus, a change in a relative positional distance of the first data processing apparatus to the second data processing apparatus, a change in a communication speed of commu- nication with the second data processing apparatus, and an interruption of communication with the second data processing apparatus; and second transmitting, by the first data processing apparatus to a third data processing apparatus from among the plurality of data processing apparatuses, the data transmitted from the second data processing apparatus and saved in the first data processing apparatus.

2. The data sharing method according to claim 1, wherein the second transmitting includes transmitting the data to the third data processing apparatus, when at least one among a decrease in the remaining battery power of the first data processing apparatus, an increase in the relative positional distance and a decrease in the communication speed is detected.

3. The data sharing method according to claim 1, wherein the detecting includes detecting a shortage of available memory of the first data processing apparatus when the available memory is less than a volume of the data transmitted from the second data processing apparatus, and the second transmitting includes transmitting the data to the third data processing apparatus, based on a result of a comparison of the communication speed and a speed of storing the data to storage.

4. The data sharing method according to claim 1, wherein the second transmitting includes transmitting the data to the third data processing apparatus that communicates with the second data processing apparatus at a communication speed that is highest among the plurality of data processing apparatuses, excluding the first data processing apparatus.

5. The data sharing method according to claim 1, wherein the third data processing apparatus is a data processing apparatus that communicates with a data processing apparatus that uses the data and is from among the plurality of data processing apparatuses.

6. The data sharing method according to claim 1, wherein the second transmitting includes transmitting, when an interruption of the communication with the second data processing apparatus is detected, the data to a fourth data processing apparatus that communicates with the second data processing apparatus after a given period elapses.

7. The data sharing method according to claim 6, wherein the second transmitting of the data to the fourth data processing apparatus is conducted when the communication with the second data processing apparatus is not restored before the given period elapses.

8. The data sharing method according to claim 1, further comprising sharing the data with the second data processing apparatus, by the third data processing apparatus, upon receiving the data from the first data processing apparatus.

9. A data processing system comprising:
a memory device that stores data shared among a plurality of data processing apparatuses; and
a hardware processor that is configured to:
manage memory capacity of the data processing system,
monitor remaining battery power of the data processing system,
detect a relative positional distance to a specific data processing apparatus among the plurality of data processing apparatuses, and monitor communication speed with the specific data processing apparatus,
transmit a data transmitted from the specific data processing apparatus to another data processing apparatus from among the plurality of data processing apparatuses, upon detecting a shortage of the memory capacity, and
delete the data from the memory device.

10. The data processing system according to claim 9, wherein
the processor is further configured to transmit the data to the other data processing apparatus upon detecting a decrease in the remaining battery power.

11. The data processing system according to claim 9, wherein
the processor is further configured to transmit the data to the other data processing apparatus upon detecting any one among an increase in the relative positional distance and a decrease in the communication speed.

* * * * *